US011032552B2

(12) United States Patent
Zhang

(10) Patent No.: US 11,032,552 B2
(45) Date of Patent: Jun. 8, 2021

(54) VIDEO ENCODING METHOD, VIDEO ENCODING APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/939,928

(22) Filed: Jul. 27, 2020

(65) Prior Publication Data

US 2020/0359032 A1 Nov. 12, 2020

Related U.S. Application Data

(63) Continuation of application No. PCT/CN2019/081239, filed on Apr. 3, 2019.

(30) Foreign Application Priority Data

May 3, 2018 (CN) .......................... 201810413949.2

(51) Int. Cl.
*H04N 19/159* (2014.01)
*H04N 19/122* (2014.01)
(Continued)

(52) U.S. Cl.
CPC ......... *H04N 19/159* (2014.11); *H04N 19/122* (2014.11); *H04N 19/186* (2014.11); *H04N 19/96* (2014.11)

(58) Field of Classification Search
None
See application file for complete search history.

(56) References Cited

U.S. PATENT DOCUMENTS

2013/0101029 A1* 4/2013 Srinivasan ............. H04N 19/11
375/240.12
2015/0063452 A1* 3/2015 Kim ..................... H04N 19/147
375/240.12
(Continued)

FOREIGN PATENT DOCUMENTS

CN 103338371 A 10/2013
CN 104954788 A 9/2015
(Continued)

OTHER PUBLICATIONS

The World Intellectual Property Organization (WIPO) International Search Report for PCT/CN2019/081239 dated Jun. 24, 2019 7 Pages (including translation).
(Continued)

*Primary Examiner* — Talha M Nawaz
(74) *Attorney, Agent, or Firm* — Anova Law Group, PLLC

(57) ABSTRACT

A video encoding method for an electronic device includes: dividing at least one CTU of a video image frame to acquire video prediction units of different sizes; performing initial selection on intra-predicted brightness prediction directions of the video prediction units according to a first rate-distortion-evaluation-function, to obtain a preset number of intra-predicted initially-selected brightness-directions of the video prediction units; performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit; performing fine selection on intra-predicted chroma prediction directions of the video prediction units according to the second rate-distortion-evaluation-function, to obtain intra-predicted optimal chroma-
(Continued)

directions of the video prediction units; and performing intra-prediction encoding on a current video encoding unit according to intra-predicted optimal brightness-directions and the intra-predicted optimal chroma-directions.

20 Claims, 10 Drawing Sheets

(51) Int. Cl.
*H04N 19/186* (2014.01)
*H04N 19/96* (2014.01)

(56) References Cited

U.S. PATENT DOCUMENTS

| | | | | |
|---|---|---|---|---|
| 2016/0366437 | A1* | 12/2016 | Zhou | H04N 19/147 |
| 2017/0094313 | A1* | 3/2017 | Zhao | H04N 19/12 |
| 2018/0103252 | A1* | 4/2018 | Hsieh | H04N 19/18 |
| 2018/0124397 | A1* | 5/2018 | Yoo | H04N 19/109 |

FOREIGN PATENT DOCUMENTS

| | | |
|---|---|---|
| CN | 105657420 A | 6/2016 |
| CN | 105791863 A | 7/2016 |
| CN | 106131548 A | 11/2016 |

OTHER PUBLICATIONS

Jianqiu Huang et al., "Fast Intra Prediction Mode Judgment Algorithm Based on HEVC", Video Engineering, vol. 38, No. 15, Aug. 2, 2014 (Aug. 2, 2014), pp. 6-8, and figures 1 and 2 6 pages.

The European Patent Office (EPO) The Extended European Search Report for 19796418.2 dated Mar. 30, 2021 10 Pages.

Andrzej Abramowski et al., "A survey over possible intra prediction optimizations in the H.265/HEVC encoder," Proceedings of SPI E, vol. 10031, Sep. 28, 2016 (Sep. 28, 2016), pp. 1003153-1 to 1003153-13. 13 pages.

Jaehwan Kim et al., "Fast Intra Mode Decision of HEVC based on Hierarchical Structure," 8th International Conference on Information, Communications and Signal Processing (ICICS) 2011 , IEEE, Dec. 13, 2011 (Dec. 13, 2011) , pp. 1-4. 4 pages.

Jiawen Gu et al., "A Novel SATD Based Fast Intra Prediction for HEVC," 2017 IEEE International Conference on Image Processing (ICIP), IEEE, Sep. 17, 2017 (Sep. 17, 2017), pp. 1667-1671. 5 pages.

Xin Zhou et al., "Visual saliency-based fast intracoding algorithm for high efficiency video coding," Journal of Electronic Imaging, SPIE—International Society for Optical Engineering, US, vol. 26, No. 1, Jan. 1, 2017 (Jan. 1, 2017) , pp. 013019-1 to 013019-11. 12 pages.

* cited by examiner

VIDEO ENCODING METHOD, VIDEO ENCODING APPARATUS, ELECTRONIC DEVICE, AND STORAGE MEDIUM

RELATED APPLICATIONS

This application is a continuation application of PCT Patent Application No. PCT/CN2019/081239, filed on Apr. 3, 2019, which claims priority to Chinese Patent Application No. 201810413949.2, entitled "VIDEO ENCODING METHOD, VIDEO ENCODING APPARATUS, ELECTRONIC DEVICE, AND STORAGE MEDIUM" filed with the China National Intellectual Property Administration, May 3, 2018, which is incorporated by reference in its entirety.

FIELD OF THE TECHNOLOGY

The present disclosure relates to the field of video encoding and, in particular, to a video encoding method, a video encoding apparatus, an electronic device, and a storage medium.

BACKGROUND

High-definition, high-frame rate, and high-compression ratio videos are the future development trend. The popular H.264 compression mode nowadays is subject to some limitations in its principle and cannot satisfy future requirements.

Video encoding is performed by block and uses an intra-frame block mode and an inter-frame block mode. Intra-frame blocks are most significant throughout video encoding. Intra-frame block prediction is performed on all code blocks in a case that the type of a current frame is an I frame (an independent frame carrying all information, and can be independently decoded without referring to another image). Intra-frame prediction is eventually chosen for only some code blocks in a case that the type of a current frame is a B frame (a bidirectional prediction code frame, that is, an image frame recording differences between the current frame and a previous frame and a next frame) or a P frame (an inter-frame prediction code frame, that is, an image frame that can be encoded only by referring to a previous frame).

During inter-frame coding, reference pixels of an inter-frame block are all based on reconstructed data of an intra-frame block. Therefore, the image quality of intra-frame block encoding is vital. In a case that the image quality of intra-frame block encoding is poor, the image quality of reference pixels of an inter-frame block that are subsequently used as a reference becomes worse, leading to an increasingly large error. As a result, a bit stream encoded with equal quality is much larger, and image quality with an equal bit stream is much worse.

Therefore, the encoding is prone to an insignificant speed increase and a greatly reduced compression ratio in a case that intra-frame block prediction of a code block is inadequately optimized. The present disclosure may be provided to improve an intra-frame prediction method of a code block to increase the encoding speed of video encoding and improve the degrees of encoding and compression of video encoding.

SUMMARY

Embodiments of the present disclosure provide a video encoding method and a video encoding apparatus that have a relatively high encoding speed of video encoding and relatively high degrees of encoding and compression of video encoding, to resolve the technical problem that the encoding is prone to an insignificant speed increase and a greatly reduced compression ratio in a case that intra-frame block prediction of a code block is inadequately optimized, and other problems.

An embodiment of the present disclosure provides a video encoding method for an electronic device. The method includes: receiving a video image frame; acquiring at least one coding tree unit (CTU) of the video image frame; dividing the CTU according to different video prediction unit division rules, to acquire video prediction units of different sizes of the CTU; and performing initial selection on intra-predicted brightness prediction directions of the video prediction units of different sizes according to a first rate-distortion-evaluation-function, to obtain a preset number of intra-predicted initially-selected brightness-directions of the video prediction units of different sizes. The method also includes performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size; performing fine selection on intra-predicted chroma prediction directions of the video prediction units of different sizes according to the second rate-distortion-evaluation-function, to obtain intra-predicted optimal chroma-directions of the video prediction units of different sizes; and performing intra-prediction encoding on a current video encoding unit according to intra-predicted optimal brightness-directions of the video prediction units of different sizes and the intra-predicted optimal chroma-directions of the video prediction units of different sizes.

An embodiment of this application further provides a video encoding apparatus, including: a memory and a processor. The processor is configured to perform: receiving a video image frame; acquiring at least one coding tree unit (CTU) of the video image frame; dividing the CTU according to different video prediction unit division rules, to acquire video prediction units of different sizes of the CTU; and performing initial selection on intra-predicted brightness prediction directions of the video prediction units of different sizes according to a first rate-distortion-evaluation-function, to obtain a preset number of intra-predicted initially-selected brightness-directions of the video prediction units of different sizes; performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size; performing fine selection on intra-predicted chroma prediction directions of the video prediction units of different sizes according to the second rate-distortion-evaluation-function, to obtain intra-predicted optimal chroma-directions of the video prediction units of different sizes; and performing intra-prediction encoding on a current video encoding unit according to intra-predicted optimal brightness-directions of the video prediction units of different sizes and the intra-predicted optimal chroma-directions of the video prediction units of different sizes.

An embodiment of this application further provides a storage medium, storing processor executable instructions, the instructions, when being executed by one or more processors, implementing: receiving a video image frame; acquiring at least one coding tree unit (CTU) of the video image frame; dividing the CTU according to different video prediction unit division rules, to acquire video prediction units of different sizes of the CTU; and performing initial selection on intra-predicted brightness prediction directions of the video prediction units of different sizes according to a first rate-distortion-evaluation-function, to obtain a preset number of intra-predicted initially-selected brightness-directions of the video prediction units of different sizes; performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size; performing fine selection on intra-predicted chroma prediction directions of the video prediction units of different sizes according to the second rate-distortion-evaluation-function, to obtain intra-predicted optimal chroma-directions of the video prediction units of different sizes; and performing intra-prediction encoding on a current video encoding unit according to intra-predicted optimal brightness-directions of the video prediction units of different sizes and the intra-predicted optimal chroma-directions of the video prediction units of different sizes.

Other aspects of the present disclosure can be understood by those skilled in the art in light of the description, the claims, and the drawings of the present disclosure.

DESCRIPTION OF EMBODIMENTS

Figure 1:
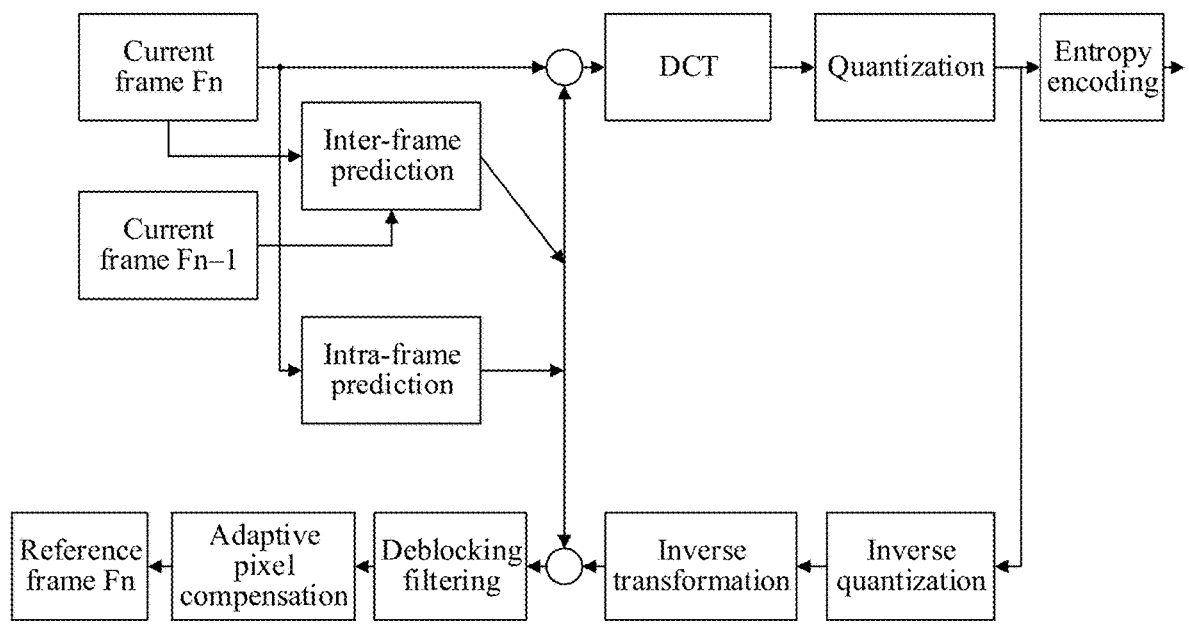
FIG. 1 shows the structure of a high efficiency video coding (HEVC) encoding framework according to the present disclosure.

Referring to the drawings, same component symbols represent same components. The following descriptions are specific embodiments of the present disclosure based on the examples, and are not to be construed as a limitation to other embodiments of the present disclosure that are not described herein in detail.

In the following description, the specific embodiments of the present disclosure are described with reference to steps and signs of operations that are performed by one or more computers, unless indicated otherwise. Therefore, these steps and operations may be learned from the descriptions, where it is mentioned for a plurality of times that the steps and operations are performed by a computer, including that the steps and operations are manipulated by a computer processing unit of an electronic signal that represents data in a structured pattern. This operation converts the data or maintains the data at a location in an internal memory system of the computer, which reconfigures or otherwise alters the operation of the computer in a manner well known by a person skilled in the art. A data structure in which data is maintained is a physical location of the internal memory, and has a specific feature defined by the format of the data. The data structures where data is maintained are physical locations of the memory that have particular properties defined by the format of the data. However, while the principle of the present disclosure is being described in the foregoing text, it is not meant to be limiting as a person skilled in the art will appreciate that the various steps and operations described hereinafter may be implemented in hardware.

A video encoding method and a video encoding apparatus according to the present disclosure may be disposed in any electronic device and used to perform an intra-prediction encoding operation on various types of video image frames to increase the encoding speed of video encoding and improve the degrees of encoding and compression of video encoding. The electronic device includes, but is not limited to, a wearable device, a head mounted device, a medical health platform, a personal computer, a server computer, a handheld or laptop device, a mobile device (for example, a mobile phone, a personal digital assistant (PDA), and a media player), a multiprocessor system, a consumption-based electronic device, a minicomputer, a mainframe computer, a distributed computing environment including the foregoing any system or device, and the like. The electronic device may be a video encoding server or terminal, to increase the encoding speed of corresponding video encoding and improve the degrees of encoding and compression of video encoding.

FIG. 1 shows the structure of an HEVC encoding framework according to the present disclosure. One frame of image is transmitted into an encoder. Intra-prediction or inter-prediction is first performed to obtain a predicted value. Subtraction is performed on the predicted value and inputted data to obtain a residual. Discrete cosine transform (DCT) and quantization are then performed to obtain a residual coefficient. The residual coefficient is then transmitted into an entropy encoding module to output a bit stream. Inverse quantization and inverse transformation are performed on the residual coefficient at the same time to obtain a residual value of a reconstructed image. The residual value is then added to an intra-prediction value or an inter-prediction value to obtain the reconstructed image. Deblocking filtering and adaptive pixel compensation are then performed on the reconstructed image before the reconstructed image enters a reference frame queue for use as a next frame of reference image.

Figure 2:
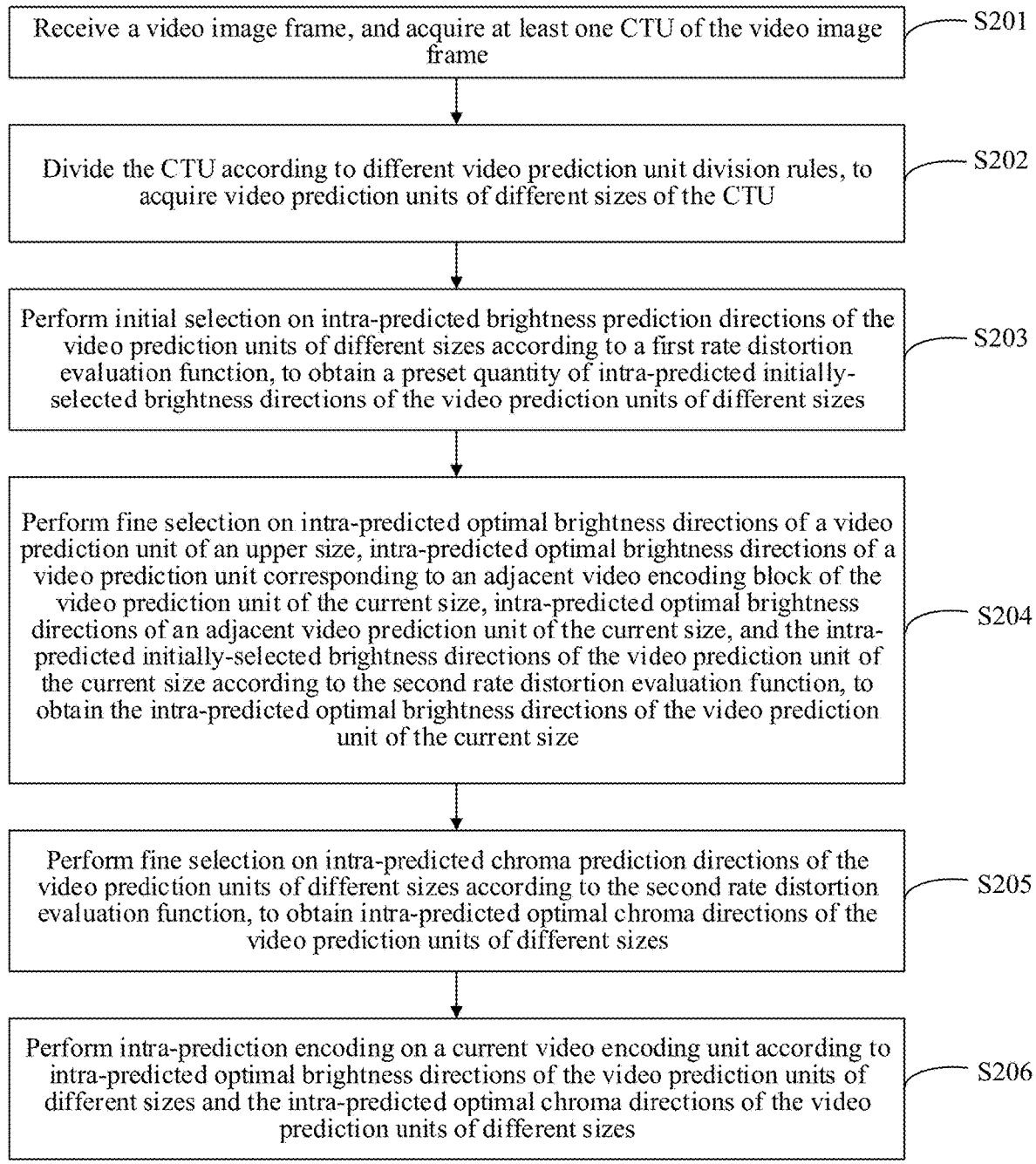
FIG. 2 is a flowchart of a video encoding method according to the present disclosure.

FIG. 2 is a flowchart of a video encoding method according to the present disclosure. The video encoding method in this embodiment may be implemented by the foregoing electronic device. The video encoding method in this embodiment is used to perform an intra-prediction encoding operation on an independent video image frame that allows an independent decoding operation. An intra-prediction encoding process includes the followings.

S201: Receive a video image frame, and acquire at least one CTU of the video image frame.

S202: Divide the CTU according to different video prediction unit division rules, to acquire video prediction units of different sizes of the CTU.

S203: Perform initial selection on intra-predicted brightness prediction directions of the video prediction units of different sizes according to a first rate-distortion-evaluation-function, to obtain a preset number of intra-predicted initially-selected brightness-directions of the video prediction units of different sizes.

S204: Perform fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size.

S205: Perform fine selection on intra-predicted chroma prediction directions of the video prediction units of different sizes according to the second rate-distortion-evaluation-function, to obtain intra-predicted optimal chroma-directions of the video prediction units of different sizes.

S206: Perform intra-prediction encoding on a current video encoding unit according to intra-predicted optimal brightness-directions of the video prediction units of different sizes and the intra-predicted optimal chroma-directions of the video prediction units of different sizes.

A process of performing intra-prediction encoding on a video image frame in the video encoding method in one embodiment is described below in detail.

In S201, a video encoding apparatus (for example, a video encoding server) receives a video image frame that requires video encoding processing. Subsequently, the video encoding apparatus divides an encoding unit in the video image frame to acquire at least one CTU. Each CTU may include a plurality of video prediction units. In the video encoding method in one embodiment, intra-prediction encoding optimization is performed on video prediction units to implement intra-prediction encoding optimization of a current video image frame.

In S202, the video encoding apparatus divides the CTU according to different video prediction unit division rules (for example, a quadtree recursive division mode), to acquire video prediction units of different sizes of the CTU.

Figure 3:
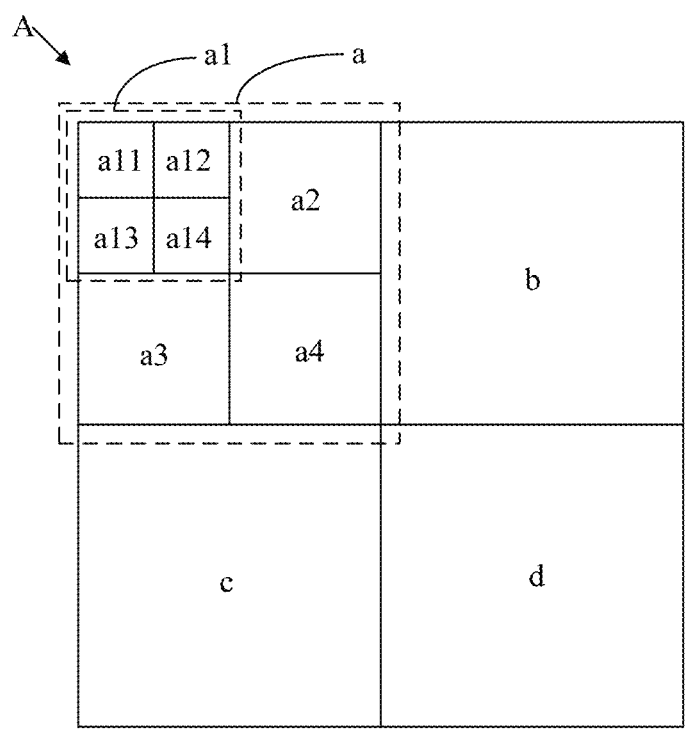
FIG. 3 is a schematic structural diagram of a code tree unit (CTU) according to the present disclosure.

FIG. 3 is a schematic structural diagram of a CTU in the embodiment shown in FIG. 2 according to the present disclosure. A CTU in an encoding unit of a video image frame includes one 64*64 video prediction unit (for example, a video prediction unit A), four 32*32 video prediction units (for example, a video prediction unit a, a video prediction unit b, a video prediction unit c, and a video prediction unit d), 16 16*16 video prediction units (for example, a video prediction unit a1, a video prediction unit a2, a video prediction unit a3, and a video prediction unit a4), 64 8*8 video prediction units (for example, a video prediction unit a11, a video prediction unit a12, a video prediction unit a13, and a video prediction unit a14) or 256 4*4 video prediction units (not shown in the figure).

In S203, the video encoding apparatus performs, according to the first rate-distortion-evaluation-function (using a Sum of Absolute Transformed Difference (SATD) (hadamard transform) rate distortion calculation function), initial selection on the intra-predicted brightness prediction directions of the video prediction units of different sizes acquired in S202, to obtain the preset number of intra-predicted initially-selected brightness-directions of the video prediction units of different sizes.

The intra-predicted brightness prediction directions of the video prediction units herein include 35 pre-selected brightness prediction directions. The 35 brightness prediction directions include a planar-mode brightness prediction direction, a DC-mode brightness prediction direction, and 33 angular-mode brightness prediction directions.

A horizontal linear filter and a vertical linear filter are used for the planar-mode brightness prediction direction, and an average value of results from the two linear filters is used as a predicted value of a current block pixel. This approach can make predicted pixels change smoothly, can improve the subjective quality of a video compared with other modes, and is applicable to an area with slowly changing pixel values.

A predicted value of a current block pixel in the DC-mode brightness prediction direction is obtained through an average value of reference pixels on the left side and above the current block pixel, and is applicable to a large-area planar area.

Figure 4:
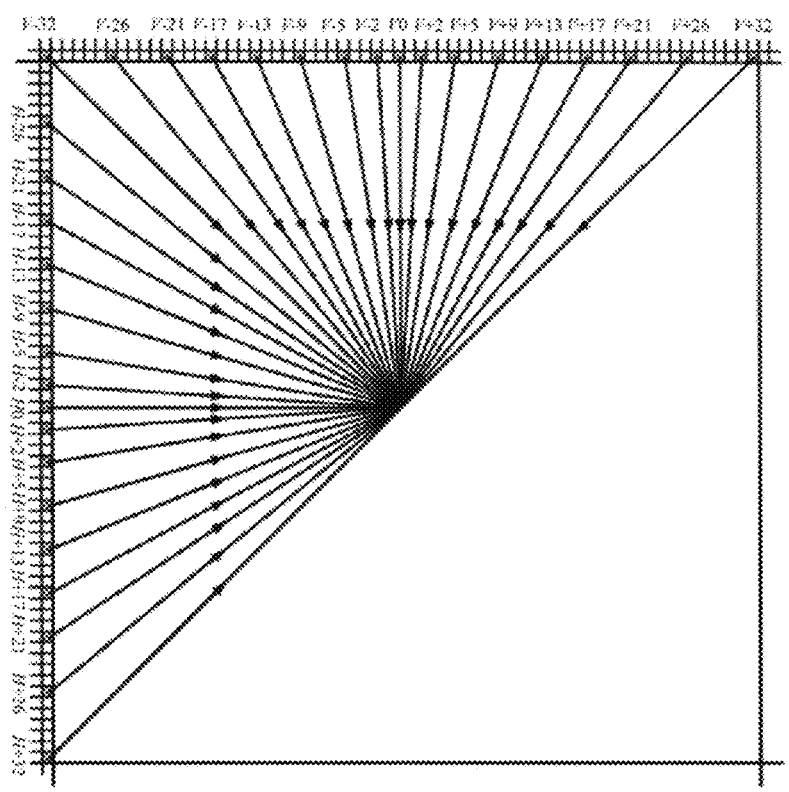
FIG. 4 is a schematic diagram of 33 angular modes in the method shown in FIG. 2 according to the present disclosure.

The 33 angular-mode brightness prediction directions are shown in FIG. 4. V0 represents a vertical direction, and H0 represents a horizontal direction. It may be considered that all the remaining angular-mode brightness prediction directions may be obtained by making an offset to the vertical direction or the horizontal direction. The value of the angle of the offset may be calculated according to the number below a mode, to achieve better applicability to the texture in different directions in video content.

Specifically, in a case that the video prediction unit is a 64*64 video prediction unit, the 33 angular-mode brightness prediction directions are divided into five brightness prediction direction areas (two brightness prediction direction areas have two repetitive angular-mode brightness prediction directions), so that each brightness prediction direction area has seven brightness prediction directions; and seven brightness prediction directions in a brightness prediction direction area that corresponds to a central brightness prediction direction (that is, the brightness prediction direction located in the middle of seven brightness prediction directions) with the lowest rate-distortion cost, a planar-mode brightness prediction direction, and a DC-mode brightness prediction direction are set as nine intra-predicted initially-selected brightness-directions of the 64*64 video prediction unit.

In a case that the video prediction unit is a 32*32 video prediction unit, the 33 angular-mode brightness prediction directions are divided into 11 brightness prediction direction areas, so that each brightness prediction direction area has three brightness prediction directions; and three brightness prediction directions in a brightness prediction direction area that corresponds to a central brightness prediction direction (that is, the brightness prediction direction located in the middle of three brightness prediction directions) with the lowest rate-distortion cost, a planar-mode brightness prediction direction, and a DC-mode brightness prediction direction are set as five intra-predicted initially-selected brightness-directions of the 32*32 video prediction unit.

In a case that the video prediction unit is a 16*16 video prediction unit, the 33 angular-mode brightness prediction directions are divided into 11 brightness prediction direction areas, so that each brightness prediction direction area has three brightness prediction directions; and three brightness prediction directions in a brightness prediction direction area that corresponds to a central brightness prediction direction (that is, the brightness prediction direction located in the middle of three brightness prediction directions) with the lowest rate-distortion cost, a planar-mode brightness prediction direction, and a DC-mode brightness prediction direction are set as five intra-predicted initially-selected brightness-directions of the 16*16 video prediction unit.

In a case that the video prediction unit is an 8*8 video prediction unit, the 33 angular-mode brightness prediction directions are divided into seven brightness prediction direction areas (two brightness prediction direction areas have two repetitive angular-mode brightness prediction directions), so that each brightness prediction direction area has five brightness prediction directions; and five brightness prediction directions in a brightness prediction direction area that corresponds to a central brightness prediction direction (that is, the brightness prediction direction located in the middle of five brightness prediction directions) with the lowest rate-distortion cost, a planar-mode brightness prediction direction, and a DC-mode brightness prediction direction are set as seven intra-predicted initially-selected brightness-directions of the 8*8 video prediction unit.

In a case that the video prediction unit is an 4*4 video prediction unit, the 33 angular-mode brightness prediction directions are divided into five brightness prediction direction areas (two brightness prediction direction areas have two repetitive angular-mode brightness prediction directions), so that each brightness prediction direction area has seven brightness prediction directions; and seven brightness prediction directions in a brightness prediction direction area that corresponds to a central brightness prediction direction (that is, the brightness prediction direction located in the middle of seven brightness prediction directions) with the lowest rate-distortion cost, a planar-mode brightness prediction direction, and a DC-mode brightness prediction direction are set as nine intra-predicted initially-selected brightness-directions of the 4*4 video prediction unit.

Because the 64*64 video prediction unit is a video prediction unit of the largest size, to ensure the accuracy of prediction of video prediction units of lower-layer sizes, a relatively large number of intra-predicted initially-selected brightness-directions are set for the 64*64 video prediction unit. The 4*4 or 8*8 video prediction unit is a video prediction unit of the smallest size and is very likely to become a prediction result output direction. Therefore, a relatively large number of intra-predicted initially-selected brightness-directions is also set for the 4*4 or 8*8 video prediction unit. The 16*16 or 32*32 video prediction unit is an intermediate transitional video prediction unit and is not to be used as a prediction result output direction. Therefore, a relatively small number of intra-predicted initially-selected brightness-directions may be set.

The rate-distortion cost herein may be calculated by using the following formula:

$$J=D+\lambda *R,$$

where J is the rate-distortion cost, D is a pixel distortion in a current intra-predicted initially-selected brightness-direction, R is a number of bits required for all encoding information (for example, a transformation coefficient, mode information or macroblock division manner) in the current intra-predicted initially-selected brightness-direction, and λ is a Lagrange factor. The pixel distortion D herein is calculated by using SATD (hadamard transform).

In S204, the video encoding apparatus performs fine selection on the intra-predicted optimal brightness-directions of the related video prediction unit and the intra-predicted initially-selected brightness-directions of the video prediction unit of the current size according to the second rate-distortion-evaluation-function, to obtain the intra-predicted optimal brightness-directions of the video prediction unit of the current size.

The intra-predicted optimal brightness-directions of the related video prediction unit herein are the intra-predicted optimal brightness-directions of the video prediction unit of the upper size, the intra-predicted optimal brightness-directions of the video prediction unit corresponding to the adjacent video encoding block of the video prediction unit of the current size, and the intra-predicted optimal brightness-directions of the adjacent video prediction unit of the current size.

That is, the video encoding apparatus performs fine selection on intra-predicted optimal brightness-directions of a video prediction unit of an upper size, intra-predicted optimal brightness-directions of a video prediction unit corresponding to an adjacent video encoding block of the video prediction unit of the current size, intra-predicted optimal brightness-directions of an adjacent video prediction unit of the current size, and the intra-predicted initially-selected brightness-directions of the video prediction unit of the current size according to the second rate-distortion-evaluation-function (using a Sum of Squared Difference (SSD) rate distortion calculation function), to obtain the intra-predicted optimal brightness-directions of the video prediction unit of the current size.

Specifically, the video encoding apparatus sets the preset number of intra-predicted initially-selected brightness-directions of the video prediction unit of the current size that have a relatively low rate-distortion cost as the optimized intra-predicted initially-selected brightness-directions of the video prediction unit of the current size. For example, three intra-predicted initially-selected brightness-directions of the 16*16 video prediction unit that have the lowest rate-distortion cost in five intra-predicted initially-selected brightness-directions of the 16*16 video prediction unit are set as optimized intra-predicted initially-selected brightness-directions of the video prediction unit of the current size;

The video encoding apparatus determines whether the intra-predicted initially-selected brightness-direction of the adjacent video prediction unit of the current size is the same as any of the intra-predicted optimal brightness-directions of the adjacent video prediction unit of the current size in a case that the video prediction unit is a 64*64, 32*32 or 16*16 video prediction unit.

The video encoding apparatus sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function (using an SSD rate distortion calculation function), and uses brightness-directions with the lowest fine-selection rate-distortion cost as the intra-predicted optimal brightness-directions of the video prediction unit of the current size.

The video encoding apparatus performs fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The video encoding apparatus determines whether any of the optimized intra-predicted initially-selected brightness-directions of the video prediction unit of the current size is the same as any of the intra-predicted optimal brightness-directions of the video prediction unit of the upper size, the intra-predicted optimal brightness-directions of the video prediction unit corresponding to the adjacent video encoding block of the video prediction unit of the current size, and the intra-predicted optimal brightness-directions of the adjacent video prediction unit of the current size in a case that the video prediction unit is an 8*8 video prediction unit or a 4*4 video prediction unit.

The video prediction unit corresponding to the adjacent video encoding block of the video prediction unit herein is a video prediction unit of the adjacent video encoding block. The adjacent video prediction unit of the video prediction unit is an adjacent video prediction unit in the same video encoding block.

The video encoding apparatus sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The video encoding apparatus performs fine selection on the intra-predicted optimal brightness-directions of the video prediction unit of the upper size, the intra-predicted optimal brightness-directions of the video prediction unit corresponding to the adjacent video encoding block of the video prediction unit of the current size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

In this way, the setting of intra-predicted optimal brightness-directions of video prediction units of various sizes is completed. Specifically, intra-predicted optimal brightness-directions of a 64*64 video prediction unit may be set first, and intra-predicted optimal brightness-directions of 32*32, 16*16, 8*8, and 4*4 video prediction units are then sequentially set.

The video encoding apparatus further determines whether a product of multiplying a fine-selection rate-distortion cost in the intra-predicted optimal brightness-directions of the video prediction unit of the current size by a set coefficient (for example, 1.05) is greater than a fine-selection rate-distortion cost in the intra-predicted optimal brightness-directions of the video prediction unit of the upper size in a case that the video prediction unit is a 4*4 video prediction unit.

In a case that the product is less than or equal to the fine-selection rate-distortion cost, the video encoding apparatus continues to calculate a fine-selection rate-distortion cost in the intra-predicted optimal brightness-directions of another video prediction unit of the current size.

In a case that the product is greater than the fine-selection rate-distortion cost, the video encoding apparatus may directly use the intra-predicted optimal brightness-directions of the video prediction unit of the upper size as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

The set coefficient herein is usually set to be slightly greater than 1, to avoid a calculation mistake of a rate-distortion cost in the intra-predicted optimal brightness-directions of the video prediction unit of the current size caused by a calculation error.

In S205, the video encoding apparatus performs fine selection on intra-predicted chroma prediction directions of the video prediction units of different sizes according to the second rate-distortion-evaluation-function, to obtain intra-predicted optimal chroma-directions of the video prediction units of different sizes.

The intra-predicted chroma prediction directions of the video prediction units herein include a planar-mode brightness prediction direction, a vertical-mode brightness prediction direction, a horizontal-mode brightness prediction direction, a DC-mode brightness prediction direction, and a corresponding brightness component mode.

The planar-mode brightness prediction directions and DC-mode brightness prediction directions are described above, and are not described again herein.

A predicted value of a current block pixel in the vertical-mode brightness prediction direction is obtained through an average value of reference pixels above the current block pixel, and is applicable to an area with vertical stripes.

A predicted value of a current block pixel in the horizontal-mode brightness prediction direction is obtained through an average value of reference pixels on the left side of the current block pixel, and is applicable to an area with horizontal stripes.

The chroma prediction direction and the brightness prediction direction in the corresponding brightness component mode are consistent.

The video encoding apparatus herein may calculate fine-selection rate-distortion costs in intra-frame chroma prediction directions in the foregoing five modes in 8*8 and 4*4 video prediction units, and use chroma prediction directions with the lowest fine-selection rate-distortion costs as intra-predicted optimal chroma-directions of the 8*8 and 4*4 video prediction units.

Specifically, the video encoding apparatus may also perform fine selection on intra-predicted optimal chroma-directions of a video prediction unit of an upper size and intra-predicted optimal chroma-directions of a video prediction unit corresponding to an adjacent video encoding block of the video prediction unit of the current size according to the second rate-distortion-evaluation-function; and use chroma-directions with the lowest fine-selection rate-distortion cost as intra-predicted optimal chroma-directions of the video prediction unit of the current size.

That is, the intra-predicted optimal chroma-directions of the video prediction unit of the upper size and the intra-predicted optimal chroma-directions of the video prediction unit corresponding to the adjacent video encoding block of the video prediction unit of the current size are consistent with the intra-predicted initially-selected chroma-directions of the video prediction unit of the current size, and the intra-predicted optimal chroma-directions of the video prediction unit of the upper size or the intra-predicted optimal chroma-directions of the video prediction unit corresponding to the adjacent video encoding block of the video prediction unit of the current size may be directly used as the intra-predicted optimal chroma-directions of the video prediction unit of the current size.

In S206, the video encoding apparatus performs initial selection or fine selection or skips encoding on the current independent video image frame according to the intra-predicted optimal brightness-directions of the video prediction units of different sizes acquired in S204 and the intra-predicted optimal chroma-directions of the video prediction units of different sizes acquired in S205, to implement prediction encoding of the current independent video image frame, increase the encoding speed of corresponding video encoding, and improve the degrees of encoding and compression of corresponding video encoding.

In this way, a process of performing an intra-prediction encoding operation on an independent video image frame that allows an independent decoding operation in the video encoding method in one embodiment is completed.

In the video encoding method in one embodiment, a specific intra-prediction encoding optimization method is used for an independent video image frame, thereby increasing the encoding speed of corresponding video encoding and improving the degrees of encoding and compression of corresponding video encoding.

Figure 5:
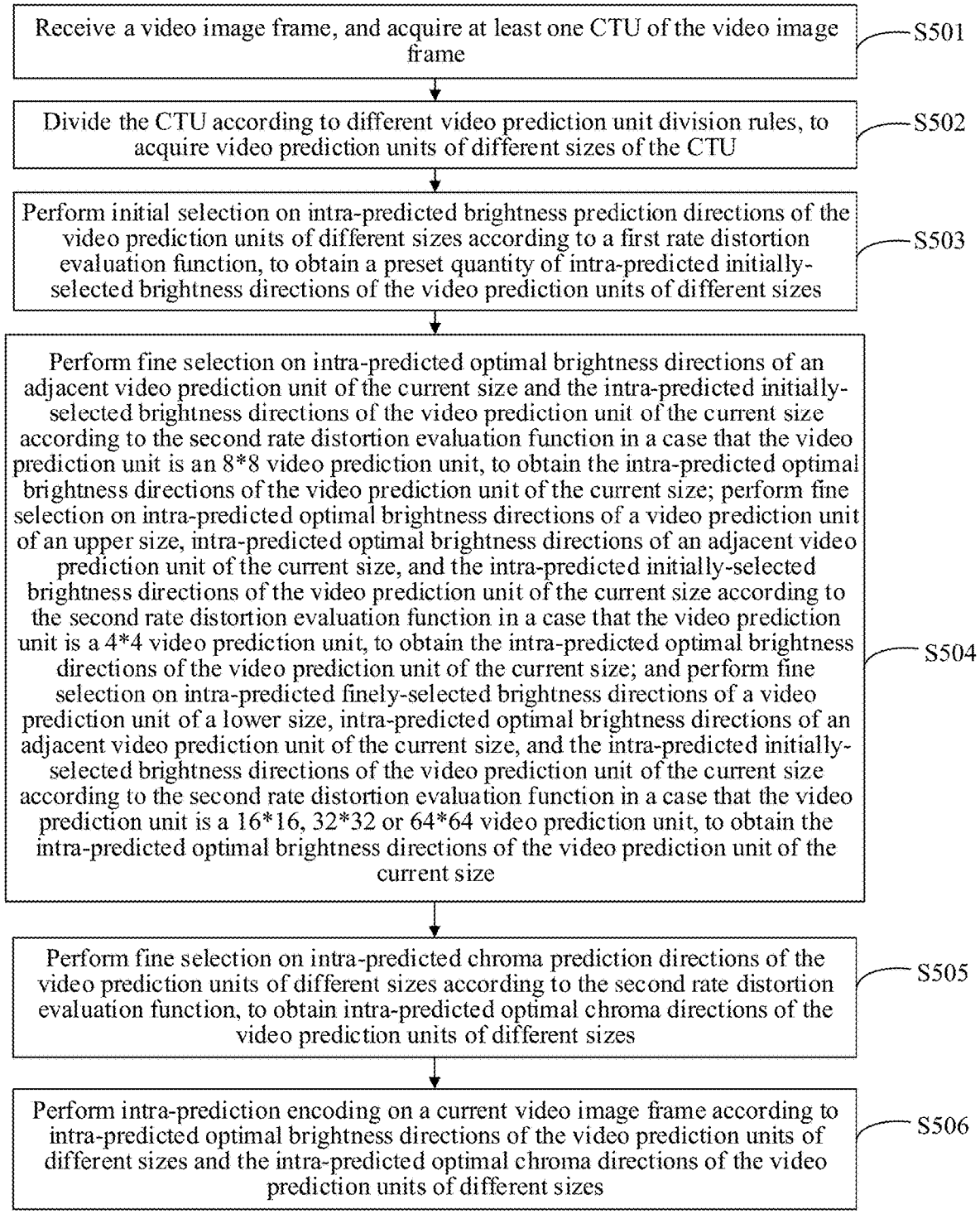
FIG. 5 is a flowchart of another video encoding method according to the present disclosure.

FIG. 5 is a flowchart of another video encoding method according to the present disclosure. The video encoding method in one embodiment may be implemented by the foregoing electronic device. The video encoding method in one embodiment may be used to perform an intra-prediction encoding operation on a bidirectional prediction code frame recording differences between a current frame and a previous frame and a next frame and an inter-frame prediction code frame recording a difference between a current frame and a previous frame. An intra-prediction encoding process includes the followings.

S501: Receive a video image frame, and acquire at least one CTU of the video image frame.

S502: Divide the CTU according to different video prediction unit division rules, to acquire video prediction units of different sizes of the CTU.

S503: Perform initial selection on intra-predicted brightness prediction directions of the video prediction units of different sizes according to a first rate-distortion-evaluation-function, to obtain a preset number of intra-predicted initially-selected brightness-directions of the video prediction units of different sizes.

S504: Perform fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size.

S505: Perform fine selection on intra-predicted chroma prediction directions of the video prediction units of different sizes according to the second rate-distortion-evaluation-function, to obtain intra-predicted optimal chroma-directions of the video prediction units of different sizes.

S506: Perform intra-prediction encoding on a current video image frame according to intra-predicted optimal brightness-directions of the video prediction units of different sizes and the intra-predicted optimal chroma-directions of the video prediction units of different sizes.

A process of performing intra-prediction encoding on a video image frame in the video encoding method in one embodiment is described below in detail.

In S501, a video encoding apparatus receives a video image frame that requires video encoding processing. Subsequently, the video encoding apparatus divides an encoding unit in the video image frame to acquire at least one CTU. Each CTU may include a plurality of video prediction units. In the video encoding method in one embodiment, intra-prediction encoding optimization is performed on video prediction units to implement intra-prediction encoding optimization of a current video image frame.

In S502, the video encoding apparatus divides the CTU according to different video prediction unit division rules (for example, a quadtree recursive division mode), to acquire video prediction units of different sizes of the CTU.

In S503, the video encoding apparatus performs, according to a first rate-distortion-evaluation-function, initial selection on intra-predicted brightness prediction directions of the video prediction units of different sizes that are acquired in S202, to obtain a preset number of intra-predicted initially-selected brightness-directions of the video prediction units of different sizes.

The intra-predicted brightness prediction directions of the video prediction units herein include 35 pre-selected brightness prediction directions. The 35 brightness prediction directions include a planar-mode brightness prediction direction, a DC-mode brightness prediction direction, and 33 angular-mode brightness prediction directions.

Specifically, in a case that the video prediction unit is a 64*64 video prediction unit, a 32*32 video prediction unit, a 16*16 video prediction unit, an 8*8 video prediction unit, or a 4*4 video prediction unit, 33 angular-mode brightness prediction directions are described above. Details are not described herein again.

In S504, the video encoding apparatus performs fine selection on the intra-predicted optimal brightness-directions of the related video prediction unit and the intra-predicted initially-selected brightness-directions of the video prediction unit of the current size according to the second rate-distortion-evaluation-function, to obtain the intra-predicted optimal brightness-directions of the video prediction unit of the current size.

The intra-predicted optimal brightness-directions of the related video prediction unit herein are at least one of the intra-predicted optimal brightness-directions of the adjacent video prediction unit of the current size, the intra-predicted optimal brightness-directions of the video prediction unit of the upper size, and the intra-predicted finely-selected brightness-directions of the video prediction unit of the lower size.

That is, the video encoding apparatus performs fine selection on intra-predicted optimal brightness-directions of an adjacent video prediction unit of the current size and the intra-predicted initially-selected brightness-directions of the video prediction unit of the current size according to the second rate-distortion-evaluation-function in a case that the video prediction unit is an 8*8 video prediction unit, to obtain the intra-predicted optimal brightness-directions of the video prediction unit of the current size.

Specifically, the video encoding apparatus sets the preset number of intra-predicted initially-selected brightness-directions of the video prediction unit of the current size that have a relatively low rate-distortion cost as the optimized intra-predicted initially-selected brightness-directions of the video prediction unit of the current size. For example, four intra-predicted initially-selected brightness-directions of the 8*8 video prediction unit that have the lowest rate-distortion cost in seven intra-predicted initially-selected brightness-directions of the 8*8 video prediction unit are set as optimized intra-predicted initially-selected brightness-directions of the video prediction unit of the current size.

Subsequently, the video encoding apparatus determines whether any of the optimized intra-predicted initially-selected brightness-directions of the video prediction unit of the current size is the same as any of the intra-predicted optimal brightness-directions of the adjacent video prediction unit of the current size.

The video encoding apparatus sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The video encoding apparatus performs fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The video encoding apparatus performs fine selection on intra-predicted optimal brightness-directions of a video prediction unit (an 8*8 video prediction unit) of an upper size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 4*4 video prediction unit, to obtain the intra-predicted optimal brightness-directions of the video prediction unit of the current size.

Specifically, the video encoding apparatus sets the preset number of intra-predicted initially-selected brightness-directions of the video prediction unit of the current size that have a relatively low rate-distortion cost as the optimized intra-predicted initially-selected brightness-directions of the video prediction unit of the current size. For example, three intra-predicted initially-selected brightness-directions of the 4*4 video prediction unit that have the lowest rate-distortion cost in nine intra-predicted initially-selected brightness-directions of the 4*4 video prediction unit are set as optimized intra-predicted initially-selected brightness-directions of the video prediction unit of the current size.

Subsequently, the video encoding apparatus determines whether any of the optimized intra-predicted initially-selected brightness-directions of the video prediction unit of the current size is the same as any of the intra-predicted optimal brightness-directions of the video prediction unit of the upper size and the intra-predicted optimal brightness-directions of the adjacent video prediction unit of the current size.

The video encoding apparatus sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The video encoding apparatus performs fine selection on the intra-predicted optimal brightness-directions of the video prediction unit of the upper size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The video encoding apparatus performs fine selection on intra-predicted finely-selected brightness-directions of a video prediction unit of a lower size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 16*16, 32*32 or 64*64 video prediction unit, to obtain the intra-predicted optimal brightness-directions of the video prediction unit of the current size.

Specifically, the video encoding apparatus sets the preset number of intra-predicted initially-selected brightness-directions of the video prediction unit of the current size that have a relatively low rate-distortion cost as the optimized intra-predicted initially-selected brightness-directions of the video prediction unit of the current size. For example, two intra-predicted initially-selected brightness-directions having the lowest rate-distortion cost of the 16*16 video prediction unit in five intra-predicted initially-selected brightness-directions of the 16*16 and 32*32 video prediction units are set as the optimized intra-predicted initially-selected brightness-directions of the video prediction unit of the current size. One intra-predicted initially-selected brightness-direction having the lowest rate-distortion cost of the 64*64 video prediction unit in nine intra-predicted initially-selected brightness-directions of the 64*64 video prediction unit is set as the optimized intra-predicted initially-selected brightness-direction of the video prediction unit of the current size.

Subsequently, the video encoding apparatus determines whether any of the optimized intra-predicted initially-selected brightness-directions of the video prediction unit of the current size is the same as any of the intra-predicted optimal brightness-directions of the video prediction unit of the lower size and the intra-predicted optimal brightness-directions of the adjacent video prediction unit of the current size.

The video encoding apparatus sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The video encoding apparatus performs fine selection on the intra-predicted optimal brightness-directions of the video prediction unit of the lower size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

In this way, the setting of intra-predicted optimal brightness-directions of video prediction units of various sizes is completed. Specifically, intra-predicted optimal brightness-directions of an 8*8 video prediction unit may be set first, and intra-predicted optimal brightness-directions of a 4*4 video prediction unit are then set according to the intra-predicted optimal brightness-directions of the 8*8 video prediction unit. Subsequently, intra-predicted optimal brightness-directions of 16*16, 32*32, and 64*64 video prediction units are then sequentially set according to the intra-predicted optimal brightness-directions of the 8*8 video prediction unit.

The video encoding apparatus further determines whether a product of multiplying a fine-selection rate-distortion cost in the intra-predicted optimal brightness-directions of the video prediction unit of the current size by a set coefficient (for example, 1.05) is greater than a fine-selection rate-distortion cost in the intra-predicted optimal brightness-directions of the video prediction unit of the upper size in a case that the video prediction unit is a 4*4 video prediction unit.

In a case that the product is less than or equal to the fine-selection rate-distortion cost, the video encoding apparatus continues to calculate a fine-selection rate-distortion cost in the intra-predicted optimal brightness-directions of another video prediction unit of the current size.

In a case that the product is greater than the fine-selection rate-distortion cost, the video encoding apparatus may directly use the intra-predicted optimal brightness-directions of the video prediction unit of the upper size as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

The set coefficient herein is usually set to be slightly greater than 1, to avoid a calculation mistake of a rate-distortion cost in the intra-predicted optimal brightness-directions of the video prediction unit of the current size caused by a calculation error.

The video encoding apparatus further determines whether an intra-predicted optimal brightness-direction of another video prediction unit corresponding to a video encoding block to which the video prediction unit of the current size belongs is consistent with an intra-predicted finely-selected direction of the video prediction unit of the upper size in a case that the video prediction unit is a 4*4 video prediction unit.

In a case that these two directions are inconsistent, the video encoding apparatus continues to calculate a rate-distortion cost in the intra-predicted optimal brightness-directions of the video prediction unit of the current size.

In a case that the directions are consistent, the video encoding apparatus may directly use the intra-predicted optimal brightness-directions of the video prediction unit of the upper size as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

In S505, the video encoding apparatus performs fine selection on intra-predicted chroma prediction directions of the video prediction units of different sizes according to the second rate-distortion-evaluation-function, to obtain intra-predicted optimal chroma-directions of the video prediction units of different sizes.

The intra-predicted chroma prediction directions of the video prediction units herein include a planar-mode brightness prediction direction, a vertical-mode brightness prediction direction, a horizontal-mode brightness prediction direction, a DC-mode brightness prediction direction, and a corresponding brightness component mode.

The video encoding apparatus herein may calculate fine-selection rate-distortion costs in intra-frame chroma prediction directions in the foregoing five modes in 8*8 and 4*4 video prediction units, and use chroma prediction directions with the lowest fine-selection rate-distortion costs as intra-predicted optimal chroma-directions of the 8*8 and 4*4 video prediction units.

In S506, the video encoding apparatus performs initial selection or fine selection or skips encoding on the current bidirectional prediction code frame or inter-frame prediction code frame according to the intra-predicted optimal brightness-directions of the video prediction units of different sizes acquired in S504 and the intra-predicted optimal chroma-directions of the video prediction units of different sizes acquired in S505, to implement prediction encoding of the current bidirectional prediction code frame or inter-frame prediction code frame, increase the encoding speed of corresponding video encoding, and improve the degrees of encoding and compression of corresponding video encoding.

In this way, a process of performing an intra-prediction encoding operation on a bidirectional prediction code frame or inter-frame prediction code frame by the video encoding apparatus in one embodiment is completed.

In the video encoding method in one embodiment, a specific intra-prediction encoding optimization method is used for a bidirectional prediction code frame or an inter-frame prediction code frame, thereby increasing the encoding speed of corresponding video encoding and improving the degrees of encoding and compression of corresponding video encoding.

Figure 6:
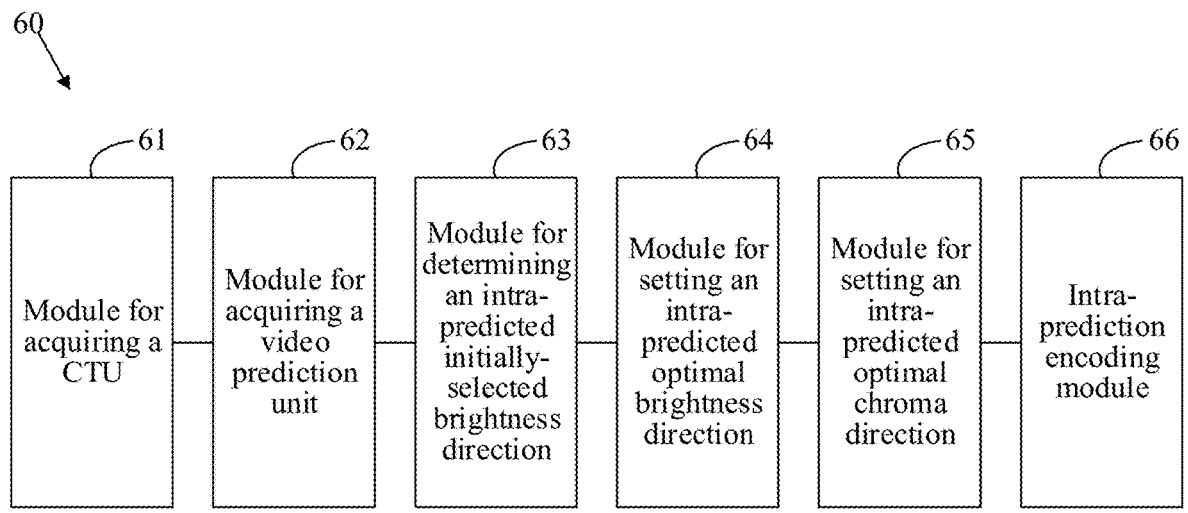
FIG. 6 is a schematic structural diagram of a video encoding apparatus according to the present disclosure.

The present disclosure further provides a video encoding apparatus. FIG. 6 is a schematic structural diagram of a video encoding apparatus according to the present disclosure. The video encoding apparatus in one embodiment may perform the video encoding method in FIG. 2. The video encoding apparatus 60 in one embodiment includes a module 61 for acquiring a CTU, a module 62 for acquiring a video prediction unit, a module 63 for determining an intra-predicted initially-selected brightness-direction, a module 64 for setting an intra-predicted optimal brightness-direction, a module 65 for setting an intra-predicted optimal chroma-direction, and an intra-prediction encoding module 66.

The module 61 for acquiring a CTU is configured to: receive a video image frame, and acquire at least one CTU of the video image frame. The module 62 for acquiring a video prediction unit is configured to divide the CTU according to different video prediction unit division rules, to acquire video prediction units of different sizes of the CTU.

The module 63 for determining an intra-predicted initially-selected brightness-direction is configured to perform initial selection on intra-predicted brightness prediction directions of the video prediction units of different sizes according to a first rate-distortion-evaluation-function, to obtain a preset number of intra-predicted initially-selected brightness-directions of the video prediction units of different sizes. The module 64 for setting an intra-predicted optimal brightness-direction is configured to perform fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size. The module 65 for setting an intra-predicted optimal chroma-direction is configured to perform fine selection on intra-predicted chroma prediction directions of the video prediction units of different sizes according to the second rate-distortion-evaluation-function, to obtain intra-predicted optimal chroma-directions of the video prediction units of different sizes. The intra-prediction encoding module 66 is configured to perform intra-prediction encoding on a current video encoding unit according to intra-predicted optimal brightness-directions of the video prediction units of different sizes and the intra-predicted optimal chroma-directions of the video prediction units of different sizes.

Figure 7:
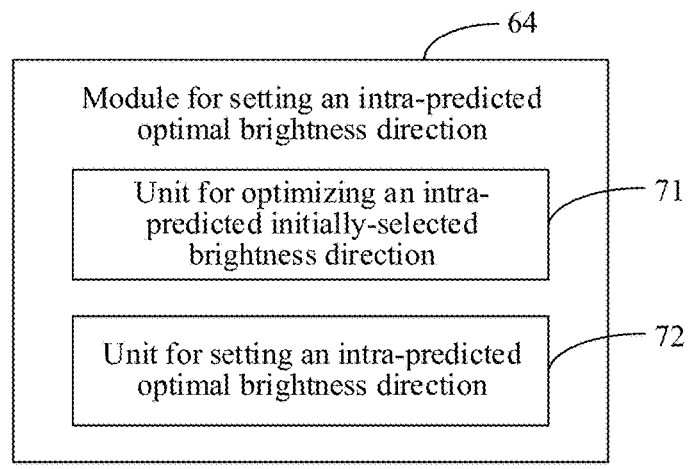
FIG. 7 is a schematic structural diagram of a module for setting an intra-predicted optimal brightness-direction in the apparatus shown in FIG. 6 according to the present disclosure.

FIG. 7 is a schematic structural diagram of a module for setting an intra-predicted optimal brightness-direction shown in FIG. 6 according to the present disclosure. The module 64 for setting an intra-predicted optimal brightness-direction includes a unit 71 for optimizing an intra-predicted initially-selected brightness-direction and a unit 72 for setting an intra-predicted optimal brightness-direction.

Figure 8:
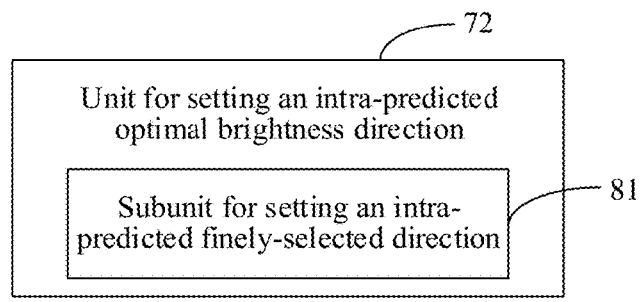
FIG. 8 is a schematic structural diagram of a unit for setting an intra-predicted optimal brightness-direction of a module for setting an intra-predicted optimal brightness-direction in the apparatus shown in FIG. 6 according to the present disclosure.

FIG. 8 is a schematic structural diagram of a unit for setting an intra-predicted optimal brightness-direction of a module for setting an intra-predicted optimal brightness-direction shown in FIG. 6 according to the present disclosure. The unit 72 for setting an intra-predicted optimal brightness-direction includes a subunit 81 for setting an intra-predicted finely-selected direction.

The subunit 81 for setting an intra-predicted finely-selected direction is configured to: determine that a product of multiplying a fine-selection rate-distortion cost in the intra-predicted optimal brightness-directions of the video prediction unit of the current size by a set coefficient is greater than a fine-selection rate-distortion cost in the intra-predicted optimal brightness-directions of the video prediction unit of the upper size in a case that the video prediction unit is a 4*4 video prediction unit, set the fine-selection rate-distortion cost in the intra-predicted optimal brightness-directions of the video prediction unit of the current size as a preset maximum value, and stop performing setting of intra-predicted optimal brightness-directions and intra-predicted optimal chroma-directions on all video prediction units of a video encoding block corresponding to the video prediction unit of the current size.

Figure 9:
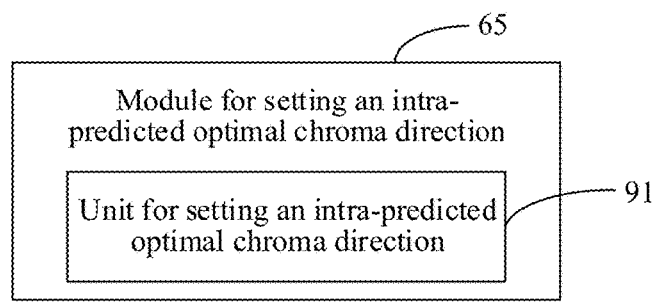
FIG. 9 is a schematic structural diagram of a module for setting an intra-predicted optimal chroma-direction in the apparatus shown in FIG. 6 according to the present disclosure.

FIG. 9 is a schematic structural diagram of a module for setting an intra-predicted optimal chroma-direction shown in FIG. 6 according to the present disclosure. The module 65 for setting an intra-predicted optimal chroma-direction includes a unit 91 for setting an intra-predicted optimal chroma-direction. The unit 91 for setting an intra-predicted optimal chroma-direction is configured to: perform fine selection on intra-predicted optimal chroma-directions of a video prediction unit of an upper size and intra-predicted optimal chroma-directions of a video prediction unit corresponding to an adjacent video encoding block of the video prediction unit of the current size according to the second rate-distortion-evaluation-function; and use chroma-directions with the lowest fine-selection rate-distortion cost as intra-predicted optimal chroma-directions of the video prediction unit of the current size.

The video encoding apparatus 60 in one embodiment is configured to perform an intra-prediction encoding operation on an independent video image frame that allows an independent decoding operation. During the use of the video encoding apparatus 60 in one embodiment, the module 61 for acquiring a CTU first receives a video image frame that requires video encoding processing. Subsequently, the module 61 for acquiring a CTU divides an encoding unit in the video image frame to acquire at least one CTU. Each CTU may include a plurality of video prediction units. In the video encoding apparatus 60 in one embodiment, intra-prediction encoding optimization is performed on video prediction units to implement intra-prediction encoding optimization of a current video image frame.

Next, the module 62 for acquiring a video prediction unit is configured to divide the CTU according to different video prediction unit division rules (for example, a quadtree recursive division mode), to acquire video prediction units of different sizes of the CTU, for example, acquire a 64*64 video prediction unit, a 32*32 video prediction unit, a 16*16 video prediction unit, an 8*8 video prediction unit, and a 4*4 video prediction unit of the CTU.

Subsequently, the module 63 for determining an intra-predicted initially-selected brightness-direction performs, according to the first rate-distortion-evaluation-function (using an SATD (hadamard transform) rate distortion calculation function), initial selection on the intra-predicted brightness prediction directions of the video prediction units of different sizes acquired by the module 62 for acquiring a video prediction unit, to obtain the preset number of intra-predicted initially-selected brightness-directions of the video prediction units of different sizes.

The intra-predicted brightness prediction directions of the video prediction units herein include 35 pre-selected brightness prediction directions. The 35 brightness prediction directions include a planar-mode brightness prediction direction, a DC-mode brightness prediction direction, and 33 angular-mode brightness prediction directions.

Specifically, in a case that the video prediction unit is a 64*64 video prediction unit, the module 63 for determining an intra-predicted initially-selected brightness-direction divides the 33 angular-mode brightness prediction directions into five brightness prediction direction areas (two brightness prediction direction areas have two repetitive angular-mode brightness prediction directions), so that each brightness prediction direction area has seven brightness prediction directions; and seven brightness prediction directions in a brightness prediction direction area that corresponds to a central brightness prediction direction (that is, the brightness prediction direction located in the middle of seven brightness prediction directions) with the lowest rate-distortion cost, a planar-mode brightness prediction direction, and a DC-mode brightness prediction direction are set as nine intra-predicted initially-selected brightness-directions of the 64*64 video prediction unit.

In a case that the video prediction unit is a 32*32 video prediction unit, the module 63 for determining an intra-predicted initially-selected brightness-direction divides the 33 angular-mode brightness prediction directions into 11 brightness prediction direction areas, so that each brightness prediction direction area has three brightness prediction directions; and three brightness prediction directions in a brightness prediction direction area that corresponds to a central brightness prediction direction (that is, the brightness prediction direction located in the middle of three brightness prediction directions) with the lowest rate-distortion cost, a planar-mode brightness prediction direction, and a DC-mode brightness prediction direction are set as five intra-predicted initially-selected brightness-directions of the 32*32 video prediction unit.

In a case that the video prediction unit is a 16*16 video prediction unit, the module 63 for determining an intra-predicted initially-selected brightness-direction divides the 33 angular-mode brightness prediction directions into 11 brightness prediction direction areas, so that each brightness prediction direction area has three brightness prediction directions; and three brightness prediction directions in a brightness prediction direction area that corresponds to a central brightness prediction direction (that is, the brightness prediction direction located in the middle of three brightness prediction directions) with the lowest rate-distortion cost, a planar-mode brightness prediction direction, and a DC-mode brightness prediction direction are set as five intra-predicted initially-selected brightness-directions of the 16*16 video prediction unit.

In a case that the video prediction unit is an 8*8 video prediction unit, the module 63 for determining an intra-predicted initially-selected brightness-direction divides the 33 angular-mode brightness prediction directions into seven brightness prediction direction areas (two brightness prediction direction areas have two repetitive angular-mode brightness prediction directions), so that each brightness prediction direction area has five brightness prediction directions; and five brightness prediction directions in a brightness prediction direction area that corresponds to a central brightness prediction direction (that is, the brightness prediction direction located in the middle of five brightness prediction directions) with the lowest rate-distortion cost, a planar-mode brightness prediction direction, and a DC-mode brightness prediction direction are set as seven intra-predicted initially-selected brightness-directions of the 8*8 video prediction unit.

In a case that the video prediction unit is an 4*4 video prediction unit, the module 63 for determining an intra-predicted initially-selected brightness-direction divides the 33 angular-mode brightness prediction directions into five brightness prediction direction areas (two brightness prediction direction areas have two repetitive angular-mode brightness prediction directions), so that each brightness prediction direction area has seven brightness prediction directions; and seven brightness prediction directions in a brightness prediction direction area that corresponds to a central brightness prediction direction (that is, the brightness prediction direction located in the middle of seven brightness prediction directions) with the lowest rate-distortion cost, a planar-mode brightness prediction direction, and a DC-mode brightness prediction direction are set as nine intra-predicted initially-selected brightness-directions of the 4*4 video prediction unit.

Because the 64*64 video prediction unit is a video prediction unit of the largest size, to ensure the accuracy of prediction of video prediction units of lower-layer sizes, a relatively large number of intra-predicted initially-selected brightness-directions are set for the 64*64 video prediction unit. The 4*4 or 8*8 video prediction unit is a video prediction unit of the smallest size and is very likely to become a prediction result output direction. Therefore, a relatively large number of intra-predicted initially-selected brightness-directions is also set for the 4*4 or 8*8 video prediction unit. The 16*16 or 32*32 video prediction unit is an intermediate transitional video prediction unit and is not to be used as a prediction result output direction. Therefore, a relatively small number of intra-predicted initially-selected brightness-directions may be set.

The rate-distortion cost herein may be calculated by using the following formula:

$$J=D+\lambda*R,$$

where J is the rate-distortion cost, D is a pixel distortion in a current intra-predicted initially-selected brightness-direction, R is a number of bits required for all encoding information (for example, a transformation coefficient, mode information or macroblock division manner) in the current intra-predicted initially-selected brightness-direction, and λ is a Lagrange factor. The pixel distortion D herein is calculated by using SATD (hadamard transform).

Next, the module 63 for determining an intra-predicted initially-selected brightness-direction is configured to perform fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size.

The intra-predicted optimal brightness-directions of the related video prediction unit herein are the intra-predicted optimal brightness-directions of the video prediction unit of the upper size, the intra-predicted optimal brightness-directions of the video prediction unit corresponding to the adjacent video encoding block of the video prediction unit of the current size, and the intra-predicted optimal brightness-directions of the adjacent video prediction unit of the current size.

That is, the video encoding apparatus performs fine selection on intra-predicted optimal brightness-directions of a video prediction unit of an upper size, intra-predicted optimal brightness-directions of a video prediction unit corresponding to an adjacent video encoding block of the video prediction unit of the current size, intra-predicted optimal brightness-directions of an adjacent video prediction unit of the current size, and the intra-predicted initially-selected brightness-directions of the video prediction unit of the current size according to the second rate-distortion-evaluation-function (using an SSD rate distortion calculation function), to obtain the intra-predicted optimal brightness-directions of the video prediction unit of the current size.

Specifically, the unit 71 for optimizing an intra-predicted initially-selected brightness-direction of the module 64 for setting an intra-predicted optimal brightness-direction sets a preset number of intra-predicted initially-selected brightness-directions of the video prediction unit of the current size that have a relatively low rate-distortion cost as optimized intra-predicted initially-selected brightness-directions of the video prediction unit of the current size. For example, three intra-predicted initially-selected brightness-directions of the 16*16 video prediction unit that have the lowest rate-distortion cost in five intra-predicted initially-selected brightness-directions of the 16*16 video prediction unit are set as optimized intra-predicted initially-selected brightness-directions of the video prediction unit of the current size.

The unit 72 for setting an intra-predicted optimal brightness-direction of the module 64 for setting an intra-predicted optimal brightness-direction determines whether the intra-predicted initially-selected brightness-direction of the adjacent video prediction unit of the current size is the same as any of the intra-predicted optimal brightness-directions of the adjacent video prediction unit of the current size in a case that the video prediction unit is a 64*64, 32*32 or 16*16 video prediction unit.

The unit 72 for setting an intra-predicted optimal brightness-direction sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function (using an SSD rate distortion calculation function), and uses brightness-directions with the lowest fine-selection rate-distortion cost as the intra-predicted optimal brightness-directions of the video prediction unit of the current size.

The unit 72 for setting an intra-predicted optimal brightness-direction performs fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The unit 72 for setting an intra-predicted optimal brightness-direction of the module 64 for setting an intra-predicted optimal brightness-direction determines whether any of the optimized intra-predicted initially-selected brightness-directions of the video prediction unit of the current size is the same as any of the intra-predicted optimal brightness-directions of the video prediction unit of the upper size, the intra-predicted optimal brightness-directions of the video prediction unit corresponding to the adjacent video encoding block of the video prediction unit of the current size, and the intra-predicted optimal brightness-directions of the adjacent video prediction unit of the current size in a case that the video prediction unit is an 8*8 video prediction unit or a 4*4 video prediction unit.

The video prediction unit corresponding to the adjacent video encoding block of the video prediction unit herein is a video prediction unit of the adjacent video encoding block. The adjacent video prediction unit of the video prediction unit is an adjacent video prediction unit in the same video encoding block.

The unit 72 for setting an intra-predicted optimal brightness-direction sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The unit 72 for setting an intra-predicted optimal brightness-direction performs fine selection on the intra-predicted optimal brightness-directions of the video prediction unit of the upper size, the intra-predicted optimal brightness-directions of the video prediction unit corresponding to the adjacent video encoding block of the video prediction unit of the current size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

In this way, the setting of intra-predicted optimal brightness-directions of video prediction units of various sizes is completed. Specifically, intra-predicted optimal brightness-directions of a 64*64 video prediction unit may be set first, and intra-predicted optimal brightness-directions of 32*32, 16*16, 8*8, and 4*4 video prediction units are then sequentially set.

The subunit 81 for setting an intra-predicted finely-selected direction of the unit 72 for setting an intra-predicted optimal brightness-direction further determines whether a product of multiplying a fine-selection rate-distortion cost in the intra-predicted optimal brightness-directions of the video prediction unit of the current size by a set coefficient (for example, 1.05) is greater than a fine-selection rate-distortion cost in the intra-predicted optimal brightness-directions of the video prediction unit of the upper size in a case that the video prediction unit is a 4*4 video prediction unit.

In a case that the product is less than or equal to the fine-selection rate-distortion cost, a fine-selection rate-distortion cost in the intra-predicted optimal brightness-directions of another video prediction unit of the current size is calculated subsequently.

In a case that the product is greater than the fine-selection rate-distortion cost, the intra-predicted optimal brightness-directions of the video prediction unit of the upper size may be directly used as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

The set coefficient herein is usually set to be slightly greater than 1, to avoid a calculation mistake of a rate-distortion cost in the intra-predicted optimal brightness-directions of the video prediction unit of the current size caused by a calculation error.

Next, the module 65 for setting an intra-predicted optimal chroma-direction performs fine selection on intra-predicted chroma prediction directions of the video prediction units of different sizes according to the second rate-distortion-evaluation-function, to obtain intra-predicted optimal chroma-directions of the video prediction units of different sizes.

The intra-predicted chroma prediction directions of the video prediction units herein include a planar-mode brightness prediction direction, a vertical-mode brightness prediction direction, a horizontal-mode brightness prediction direction, a DC-mode brightness prediction direction, and a corresponding brightness component mode.

The video encoding apparatus herein may calculate fine-selection rate-distortion costs in intra-frame chroma prediction directions in the foregoing five modes in 8*8 and 4*4 video prediction units, and use chroma prediction directions with the lowest fine-selection rate-distortion costs as intra-predicted optimal chroma-directions of the 8*8 and 4*4 video prediction units.

Specifically, the unit 91 for setting an intra-predicted optimal chroma-direction of the module 65 for setting an intra-predicted optimal chroma-direction may further perform fine selection on intra-predicted optimal chroma-directions of a video prediction unit of an upper size and intra-predicted optimal chroma-directions of a video prediction unit corresponding to an adjacent video encoding block of the video prediction unit of the current size according to the second rate-distortion-evaluation-function; and use chroma-directions with the lowest fine-selection rate-distortion cost as intra-predicted optimal chroma-directions of the video prediction unit of the current size.

That is, the intra-predicted optimal chroma-directions of the video prediction unit of the upper size and the intra-predicted optimal chroma-directions of the video prediction unit corresponding to the adjacent video encoding block of the video prediction unit of the current size are consistent with the intra-predicted initially-selected chroma-directions of the video prediction unit of the current size, and the unit for setting an intra-predicted optimal chroma-direction may directly use the intra-predicted optimal chroma-directions of the video prediction unit of the upper size or the intra-predicted optimal chroma-directions of the video prediction unit corresponding to the adjacent video encoding block of the video prediction unit of the current size as the intra-predicted optimal chroma-directions of the video prediction unit of the current size.

Finally, the intra-prediction encoding module 66 performs initial selection or fine selection or skips encoding on the current independent video image frame according to the intra-predicted optimal brightness-directions of the video prediction units of different sizes acquired by the module 64 for setting an intra-predicted optimal brightness-direction and the intra-predicted optimal chroma-directions of the video prediction units of different sizes acquired by the module 65 for setting an intra-predicted optimal chroma-direction, to implement prediction encoding of the current independent video image frame, increase the encoding speed of corresponding video encoding, and improve the degrees of encoding and compression of corresponding video encoding.

In this way, a process of performing an intra-prediction encoding operation on an independent video image frame that allows an independent decoding operation by the video encoding apparatus 60 in one embodiment is completed.

In the video encoding apparatus in one embodiment, a specific intra-prediction encoding optimization method is used for an independent video image frame, thereby increasing the encoding speed of corresponding video encoding and improving the degrees of encoding and compression of corresponding video encoding.

Figure 10:
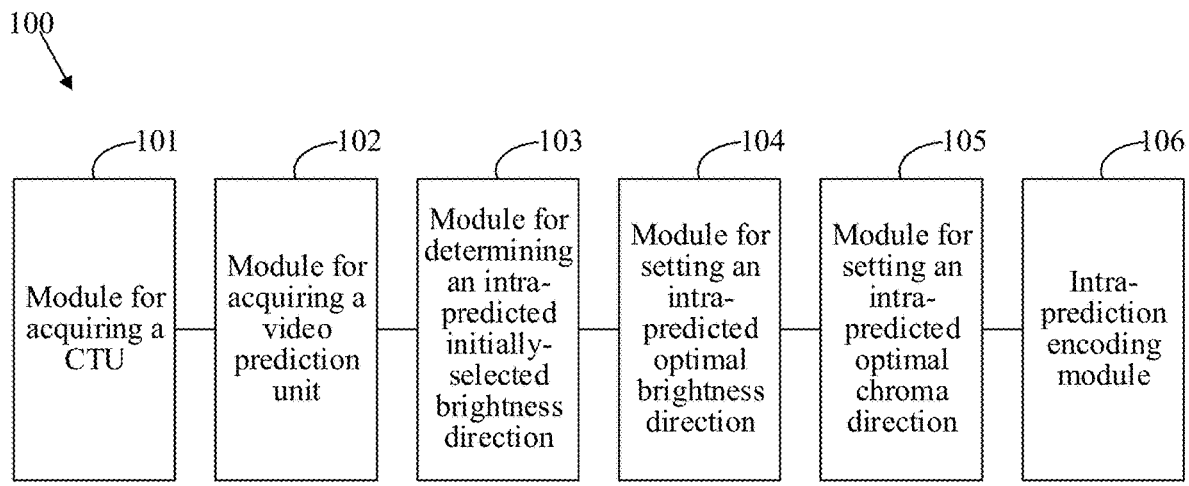
FIG. 10 is a schematic structural diagram of another video encoding apparatus according to the present disclosure.

FIG. 10 is a schematic structural diagram of another video encoding apparatus according to the present disclosure. The video encoding apparatus in one embodiment may perform the video encoding method in FIG. 5. The video encoding apparatus 100 in one embodiment includes a module 101 for acquiring a CTU, a module 102 for acquiring a video prediction unit, a module 103 for determining an intra-predicted initially-selected brightness-direction, a module 104 for setting an intra-predicted optimal brightness-direction, a module 105 for setting an intra-predicted optimal chroma-direction, and an intra-prediction encoding module 106.

The module 101 for acquiring a CTU is configured to: receive a video image frame, and acquire at least one CTU of the video image frame. The module 102 for acquiring a video prediction unit is configured to divide the CTU according to different video prediction unit division rules, to acquire video prediction units of different sizes of the CTU. The module 103 for determining an intra-predicted initially-selected brightness-direction is configured to perform initial selection on intra-predicted brightness prediction directions of the video prediction units of different sizes according to a first rate-distortion-evaluation-function, to obtain a preset number of intra-predicted initially-selected brightness-directions of the video prediction units of different sizes. The module 104 for setting an intra-predicted optimal brightness-direction is configured to perform fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size. The module 105 for setting an intra-predicted optimal chroma-direction is configured to perform fine selection on intra-predicted chroma prediction directions of the video prediction units of different sizes according to the second rate-distortion-evaluation-function, to obtain intra-predicted optimal chroma-directions of the video prediction units of different sizes. The intra-prediction encoding module 106 is configured to perform intra-prediction encoding on a current video image frame according to intra-predicted optimal brightness-directions of the video prediction units of different sizes and the intra-predicted optimal chroma-directions of the video prediction units of different sizes.

Figure 11:
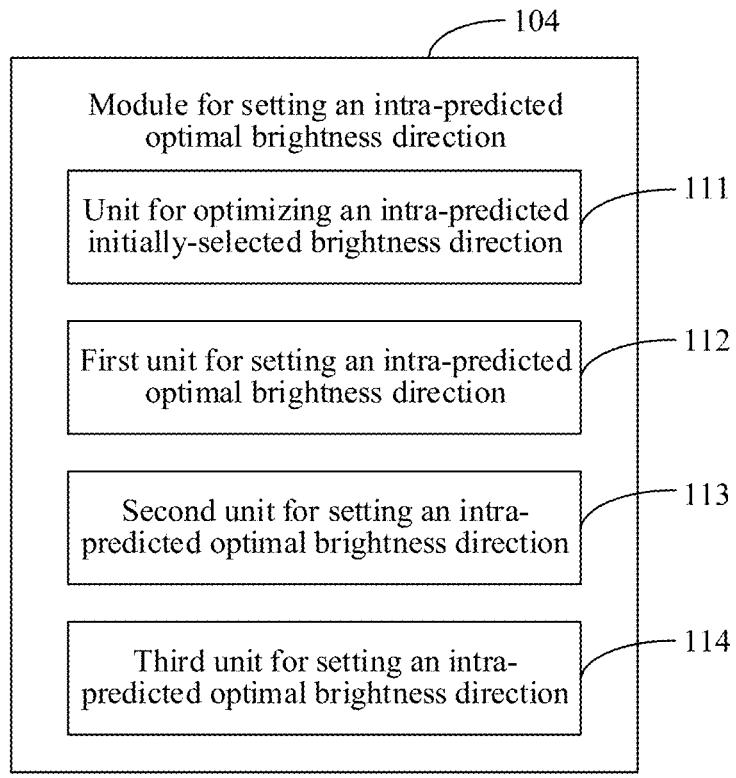
FIG. 11 is a schematic structural diagram of a module for setting an intra-predicted optimal brightness-direction in the apparatus shown in FIG. 10 according to the present disclosure.

FIG. 11 is a schematic structural diagram of a module for setting an intra-predicted optimal brightness-direction shown in FIG. 10 according to the present disclosure. The module 104 for setting an intra-predicted optimal brightness-direction includes a unit 111 for optimizing an intra-predicted initially-selected brightness-direction, a first unit 112 for setting an intra-predicted optimal brightness-direction, a second unit 113 for setting an intra-predicted optimal brightness-direction, and a third unit 114 for setting an intra-predicted optimal brightness-direction.

The unit 111 for optimizing an intra-predicted initially-selected brightness-direction is configured to set a preset number of intra-predicted initially-selected brightness-directions of the video prediction unit of the current size that have a relatively low rate-distortion cost as optimized intra-predicted initially-selected brightness-directions of the video prediction unit of the current size.

The first unit 112 for setting an intra-predicted optimal brightness-direction is configured to: determine whether any of the optimized intra-predicted initially-selected brightness-directions of the video prediction unit of the current size is the same as any of the intra-predicted optimal brightness-directions of the adjacent video prediction unit of the current size in a case that the video prediction unit is an 8*8 video prediction unit; set the same optimized intra-predicted initially-selected brightness-directions having the lowest initial-selection rate-distortion cost of the video prediction unit of the current size as contrast intra-predicted initially-selected brightness-directions in a case that it is determined that they are the same; perform fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and use brightness-directions with the lowest fine-selection rate-distortion cost as the intra-predicted optimal brightness-directions of the video prediction unit of the current size; and perform fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same, and use brightness-directions with the lowest fine-selection rate-distortion cost as the intra-predicted optimal brightness-directions of the video prediction unit of the current size.

The second unit 113 for setting an intra-predicted optimal brightness-direction is configured to: determine whether any of the optimized intra-predicted initially-selected brightness-directions of the video prediction unit of the current size is the same as any of the intra-predicted optimal brightness-directions of the video prediction unit of the upper size and the intra-predicted optimal brightness-directions of the adjacent video prediction unit of the current size in a case that the video prediction unit is an 4*4 video prediction unit; set the same optimized intra-predicted initially-selected brightness-directions having the lowest initial-selection rate-distortion cost of the video prediction unit of the current size as contrast intra-predicted initially-selected brightness-directions in a case that it is determined that they are the same; perform fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and use brightness-directions with the lowest fine-selection rate-distortion cost as the intra-predicted optimal brightness-directions of the video prediction unit of the current size; and perform fine selection on the intra-predicted optimal brightness-directions of the video prediction unit of the upper size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same, and use brightness-directions with the lowest fine-selection rate-distortion cost as the intra-predicted optimal brightness-directions of the video prediction unit of the current size.

The third unit 114 for setting an intra-predicted optimal brightness-direction is configured to: determine whether any of the optimized intra-predicted initially-selected brightness-directions of the video prediction unit of the current size is the same as any of the intra-predicted optimal brightness-directions of the video prediction unit of the lower size and the intra-predicted optimal brightness-directions of the adjacent video prediction unit of the current size in a case that the video prediction unit is a 16*16, 32*32 or 64*64 video prediction unit; set the same optimized intra-predicted initially-selected brightness-directions having the lowest initial-selection rate-distortion cost of the video prediction unit of the current size as contrast intra-predicted initially-selected brightness-directions in a case that it is determined that they are the same; perform fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and use brightness-directions with the lowest fine-selection rate-distortion cost as the intra-predicted optimal brightness-directions of the video prediction unit of the current size; and perform fine selection on the intra-predicted optimal brightness-directions of the video prediction unit of the lower size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same, and use brightness-directions with the lowest fine-selection rate-distortion cost as the intra-predicted optimal brightness-directions of the video prediction unit of the current size.

Figure 12:
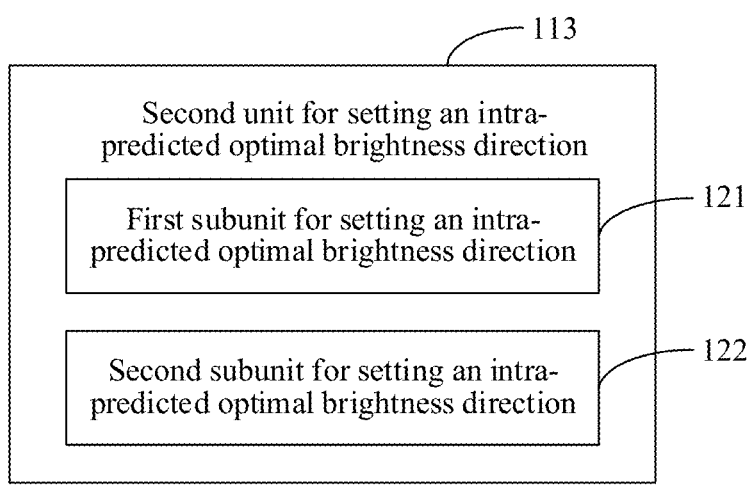
FIG. 12 is a schematic structural diagram of a second unit for setting an intra-predicted optimal brightness-direction of a module for setting an intra-predicted optimal brightness-direction in the apparatus shown in FIG. 10 according to the present disclosure.

FIG. 12 is a schematic structural diagram of a second unit for setting an intra-predicted optimal brightness-direction of a module for setting an intra-predicted optimal brightness-direction shown in FIG. 10 according to the present disclosure. The second unit 113 for setting an intra-predicted optimal brightness-direction includes a first subunit 121 for setting an intra-predicted optimal brightness-direction and a second subunit 122 for setting an intra-predicted optimal brightness-direction.

The first subunit 121 for setting an intra-predicted optimal brightness-direction is configured to: determine that a product of multiplying a fine-selection rate-distortion cost in the intra-predicted optimal brightness-directions of the video prediction unit of the current size by a set coefficient is greater than a fine-selection rate-distortion cost in the intra-predicted optimal brightness-directions of the video prediction unit of the upper size, set the fine-selection rate-distortion cost in the intra-predicted optimal brightness-directions of the video prediction unit of the current size as a preset maximum value, and stop performing setting of intra-predicted optimal brightness-directions and intra-predicted optimal chroma-directions on all video prediction units of a video encoding block corresponding to the video prediction unit of the current size. The second subunit 122 for setting an intra-predicted optimal brightness-direction is configured to: determine that intra-predicted optimal brightness-directions of other video prediction units corresponding to a video encoding block to which the video prediction unit of the current size belongs are consistent with the intra-predicted optimal brightness-directions of the video prediction unit of the upper size, set the fine-selection rate-distortion cost in the intra-predicted optimal brightness-directions of the video prediction unit of the current size as a preset maximum value, and stop performing setting of intra-predicted optimal brightness-directions and intra-predicted optimal chroma-directions on all video prediction units of a video encoding block corresponding to the video prediction unit of the current size.

The video encoding apparatus 100 in one embodiment is configured to perform an intra-prediction encoding operation on a bidirectional prediction code frame recording differences between a current frame and a previous frame and a next frame and an inter-frame prediction code frame recording a difference between a current frame and a previous frame. During the use of the video encoding apparatus in one embodiment, the module 101 for acquiring a CTU first receives a video image frame that requires video encoding processing. Subsequently, the module 101 for acquiring a CTU divides an encoding unit in the video image frame to acquire at least one CTU. Each CTU may include a plurality of video prediction units. In the video encoding method in one embodiment, intra-prediction encoding optimization is performed on video prediction units to implement intra-prediction encoding optimization of a current video image frame.

Subsequently, the module 102 for acquiring a video prediction unit divides the CTU according to different video prediction unit division rules (for example, a quadtree recursive division mode), to acquire video prediction units of different sizes of the CTU.

Next, the module 103 for determining an intra-predicted initially-selected brightness-direction performs, according to a first rate-distortion-evaluation-function, initial selection on intra-predicted brightness prediction directions of the video prediction units of different sizes acquired by the module for acquiring a video prediction unit, to obtain a preset number of intra-predicted initially-selected brightness-directions of the video prediction units of different sizes.

The intra-predicted brightness prediction directions of the video prediction units herein include 35 pre-selected brightness prediction directions. The 35 brightness prediction directions include a planar-mode brightness prediction direction, a DC-mode brightness prediction direction, and 33 angular-mode brightness prediction directions.

Specifically, in a case that the video prediction unit is a 64*64 video prediction unit, a 32*32 video prediction unit, a 16*16 video prediction unit, an 8*8 video prediction unit, or a 4*4 video prediction unit, a division manner of 33 angular-mode brightness prediction directions by the module 103 for determining an intra-predicted initially-selected brightness-direction is described above. Details are not described herein again.

Subsequently, the module 104 for setting an intra-predicted optimal brightness-direction performs fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size.

The intra-predicted optimal brightness-directions of the related video prediction unit herein are at least one of the intra-predicted optimal brightness-directions of the adjacent video prediction unit of the current size, the intra-predicted optimal brightness-directions of the video prediction unit of the upper size, and the intra-predicted finely-selected brightness-directions of the video prediction unit of the lower size.

That is, the module 104 for setting an intra-predicted optimal brightness-direction performs fine selection on intra-predicted optimal brightness-directions of an adjacent video prediction unit of the current size and the intra-predicted initially-selected brightness-directions of the video prediction unit of the current size according to the second rate-distortion-evaluation-function in a case that the video prediction unit is an 8*8 video prediction unit, to obtain the intra-predicted optimal brightness-directions of the video prediction unit of the current size.

Specifically, the unit 111 for optimizing an intra-predicted initially-selected brightness-direction of the module 104 for setting an intra-predicted optimal brightness-direction sets a preset number of intra-predicted initially-selected brightness-directions of the video prediction unit of the current size that have a relatively low rate-distortion cost as optimized intra-predicted initially-selected brightness-directions of the video prediction unit of the current size. For example, four intra-predicted initially-selected brightness-directions of the 8*8 video prediction unit that have the lowest rate-distortion cost in seven intra-predicted initially-selected brightness-directions of the 8*8 video prediction unit are set as optimized intra-predicted initially-selected brightness-directions of the video prediction unit of the current size.

The first unit 112 for setting an intra-predicted optimal brightness-direction of the module 104 for setting an intra-predicted optimal brightness-direction determines whether any of the optimized intra-predicted initially-selected brightness-directions of the video prediction unit of the current size is the same as any of the intra-predicted optimal brightness-directions of the adjacent video prediction unit of the current size.

The first unit 112 for setting an intra-predicted optimal brightness-direction sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The first unit 112 for setting an intra-predicted optimal brightness-direction performs fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The module 104 for setting an intra-predicted optimal brightness-direction performs fine selection on intra-predicted optimal brightness-directions of a video prediction unit (an 8*8 video prediction unit) of an upper size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 4*4 video prediction unit, to obtain the intra-predicted optimal brightness-directions of the video prediction unit of the current size.

Specifically, the unit 111 for optimizing an intra-predicted initially-selected brightness-direction of the module 104 for setting an intra-predicted optimal brightness-direction sets a preset number of intra-predicted initially-selected brightness-directions of the video prediction unit of the current size that have a relatively low rate-distortion cost as optimized intra-predicted initially-selected brightness-directions of the video prediction unit of the current size. For example, three intra-predicted initially-selected brightness-directions of the 4*4 video prediction unit that have the lowest rate-distortion cost in nine intra-predicted initially-selected brightness-directions of the 4*4 video prediction unit are set as optimized intra-predicted initially-selected brightness-directions of the video prediction unit of the current size.

The second unit 113 for setting an intra-predicted optimal brightness-direction of the module 104 for setting an intra-predicted optimal brightness-direction determines whether any of the optimized intra-predicted initially-selected brightness-directions of the video prediction unit of the current size is the same as any of the intra-predicted optimal brightness-directions of the video prediction unit of the upper size and the intra-predicted optimal brightness-directions of the adjacent video prediction unit of the current size.

The second unit 113 for setting an intra-predicted optimal brightness-direction sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The second unit 113 for setting an intra-predicted optimal brightness-direction performs fine selection on the intra-predicted optimal brightness-directions of the video prediction unit of the upper size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

The module 104 for setting an intra-predicted optimal brightness-direction performs fine selection on intra-predicted finely-selected brightness-directions of a video prediction unit of a lower size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 16*16, 32*32 or 64*64 video prediction unit, to obtain the intra-predicted optimal brightness-directions of the video prediction unit of the current size.

Specifically, the unit 111 for optimizing an intra-predicted initially-selected brightness-direction of the module 104 for setting an intra-predicted optimal brightness-direction sets the preset number of intra-predicted initially-selected brightness-directions of the video prediction unit of the current size that have a relatively low rate-distortion cost as the optimized intra-predicted initially-selected brightness-directions of the video prediction unit of the current size. For example, two intra-predicted initially-selected brightness-directions having the lowest rate-distortion cost of the 16*16 video prediction unit in five intra-predicted initially-selected brightness-directions of the 16*16 and 32*32 video prediction units are set as the optimized intra-predicted initially-selected brightness-directions of the video prediction unit of the current size. One intra-predicted initially-selected brightness-direction having the lowest rate-distortion cost of the 64*64 video prediction unit in nine intra-predicted initially-selected brightness-directions of the 64*64 video prediction unit is set as the optimized intra-predicted initially-selected brightness-direction of the video prediction unit of the current size.

The third unit 114 for setting an intra-predicted optimal brightness-direction of the module 104 for setting an intra-predicted optimal brightness-direction determines whether any of the optimized intra-predicted initially-selected brightness-directions of the video prediction unit of the current size is the same as any of the intra-predicted optimal brightness-directions of the video prediction unit of the lower size and the intra-predicted optimal brightness-directions of the adjacent video prediction unit of the current size.

The third unit 114 for setting an intra-predicted optimal brightness-direction sets the same optimized intra-predicted initially-selected brightness-directions having the lowest initial-selection rate-distortion cost of the video prediction unit of the current size as contrast intra-predicted initially-selected brightness-directions in a case that it is determined that they are the same; and performs fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and uses brightness-directions with the lowest fine-selection rate-distortion cost as the intra-predicted optimal brightness-directions of the video prediction unit of the current size.

The third unit 114 for setting an intra-predicted optimal brightness-direction performs fine selection on the intra-predicted optimal brightness-directions of the video prediction unit of the lower size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and uses brightness-directions with the lowest fine-selection rate-distortion cost as the intra-predicted optimal brightness-directions of the video prediction unit of the current size.

In this way, the setting of intra-predicted optimal brightness-directions of video prediction units of various sizes is completed. Specifically, intra-predicted optimal brightness-directions of an 8*8 video prediction unit may be set first, and intra-predicted optimal brightness-directions of a 4*4 video prediction unit are then set according to the intra-predicted optimal brightness-directions of the 8*8 video prediction unit. Subsequently, intra-predicted optimal brightness-directions of 16*16, 32*32, and 64*64 video prediction units are then sequentially set according to the intra-predicted optimal brightness-directions of the 8*8 video prediction unit.

The first subunit 121 for setting an intra-predicted optimal brightness-direction of the second unit 113 for setting an intra-predicted optimal brightness-direction further determines whether a product of multiplying a fine-selection rate-distortion cost in the intra-predicted optimal brightness-directions of the video prediction unit of the current size by a set coefficient (for example, 1.05) is greater than a fine-selection rate-distortion cost in the intra-predicted optimal brightness-directions of the video prediction unit of the upper size in a case that the video prediction unit is a 4*4 video prediction unit.

In a case that the product is less than or equal to the fine-selection rate-distortion cost, a fine-selection rate-distortion cost in the intra-predicted optimal brightness-directions of another video prediction unit of the current size is calculated subsequently.

In a case that the product is greater than the fine-selection rate-distortion cost, the intra-predicted optimal brightness-directions of the video prediction unit of the upper size may be directly used as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

The set coefficient herein is usually set to be slightly greater than 1, to avoid a calculation mistake of a rate-distortion cost in the intra-predicted optimal brightness-directions of the video prediction unit of the current size caused by a calculation error.

The second subunit 122 for setting an intra-predicted optimal brightness-direction of the second unit 113 for setting an intra-predicted optimal brightness-direction further determines whether an intra-predicted optimal brightness-direction of another video prediction unit corresponding to a video encoding block to which the video prediction unit of the current size belongs is consistent with an intra-predicted finely-selected direction of the video prediction unit of the upper size in a case that the video prediction unit is a 4*4 video prediction unit.

In a case that the directions are inconsistent, a rate-distortion cost in the intra-predicted optimal brightness-directions of the video prediction unit of the current size is calculated subsequently.

In a case that the directions are consistent, the intra-predicted optimal brightness-directions of the video prediction unit of the upper size may be directly used as the eventually outputted brightness-directions. Therefore, the fine-selection rate-distortion cost in the intra-predicted optimal brightness-directions of the video prediction unit of the current size is set as a preset maximum value, to prevent an intra-predicted optimal brightness-direction of the video prediction unit of the current size being set as a prediction result output direction and stop performing setting of intra-predicted optimal brightness-directions and intra-predicted optimal chroma-directions on all video prediction units of a video encoding block corresponding to the video prediction unit of the current size.

Next, the module 105 for setting an intra-predicted optimal chroma-direction performs fine selection on intra-predicted chroma prediction directions of the video prediction units of different sizes according to the second rate-distortion-evaluation-function, to obtain intra-predicted optimal chroma-directions of the video prediction units of different sizes.

The intra-predicted chroma prediction directions of the video prediction units herein include a planar-mode brightness prediction direction, a vertical-mode brightness prediction direction, a horizontal-mode brightness prediction direction, a DC-mode brightness prediction direction, and a corresponding brightness component mode.

The video encoding apparatus herein may calculate fine-selection rate-distortion costs in intra-frame chroma prediction directions in the foregoing five modes in 8*8 and 4*4 video prediction units, and use chroma prediction directions with the lowest fine-selection rate-distortion costs as intra-predicted optimal chroma-directions of the 8*8 and 4*4 video prediction units.

Finally, the intra-prediction encoding module 106 performs initial selection or fine selection or skips encoding on the current bidirectional prediction code frame or inter-frame prediction code frame according to the intra-predicted optimal brightness-directions of the video prediction units of different sizes acquired by the module 104 for setting an intra-predicted optimal brightness-direction and the intra-predicted optimal chroma-directions of the video prediction units of different sizes acquired by the module 105 for setting an intra-predicted optimal chroma-direction, to implement prediction encoding of the current bidirectional prediction code frame or inter-frame prediction code frame, increase the encoding speed of corresponding video encoding, and improve the degrees of encoding and compression of corresponding video encoding.

In this way, a process of performing an intra-prediction encoding operation on a bidirectional prediction code frame or inter-frame prediction code frame by the video encoding apparatus 100 in one embodiment is completed.

In the video encoding apparatus in one embodiment, a specific intra-prediction encoding optimization method is used for a bidirectional prediction code frame or an inter-frame prediction code frame, thereby increasing the encoding speed of corresponding video encoding and improving the degrees of encoding and compression of corresponding video encoding.

A process of an intra-prediction encoding operation in a video encoding method and a video encoding apparatus according to the present disclosure is described below with reference to a specific embodiment. The video encoding method in this specific embodiment may be set and the video encoding apparatus in this specific embodiment may be disposed in a video encoding server and used to perform an intra-prediction encoding operation on various types of video image frames to increase the encoding speed of video encoding and improve the degrees of encoding and compression of video encoding.

Figure 13:
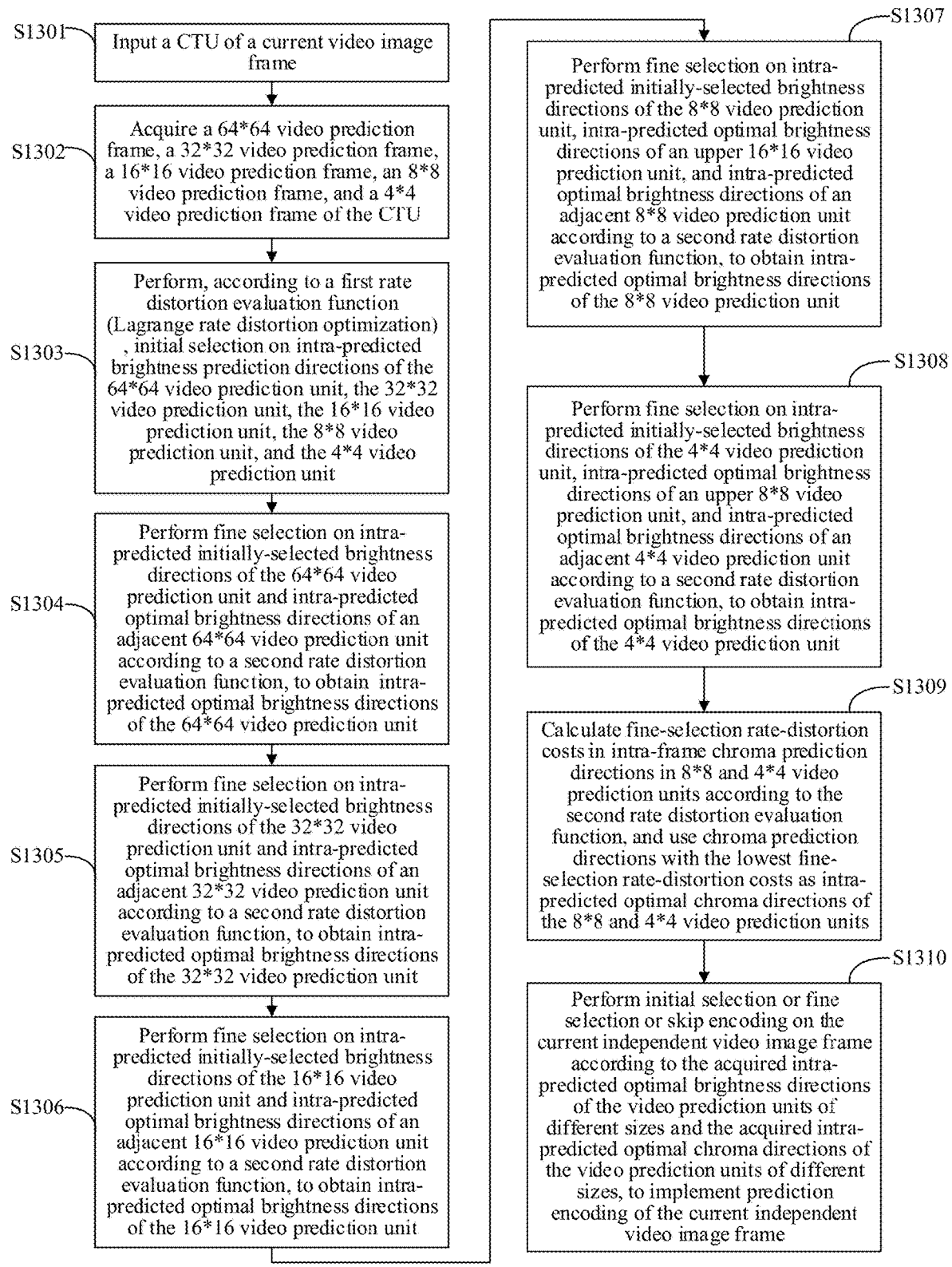
FIG. 13 is a flowchart of a specific embodiment of performing an intra-prediction encoding operation on an independent video image frame in a video encoding method and a video encoding apparatus according to the present disclosure.

During the intra-prediction encoding operation of an independent video image frame that allows an independent decoding operation in the video encoding method and the video encoding apparatus according to the present disclosure, FIG. 13 is a flowchart of a specific process of performing an intra-prediction encoding operation on an independent video image frame in a video encoding method and a video encoding apparatus according to the present disclosure. The process of the intra-prediction encoding operation includes the followings.

S1301: Input a CTU of a current video image frame.

S1302: Acquire a 64*64 video prediction unit, a 32*32 video prediction unit, a 16*16 video prediction unit, an 8*8 video prediction unit, and a 4*4 video prediction unit of the CTU.

S1303: Perform, according to a first rate-distortion-evaluation-function, initial selection on intra-predicted brightness prediction directions of the 64*64 video prediction unit, the 32*32 video prediction unit, the 16*16 video prediction unit, the 8*8 video prediction unit, and the 4*4 video prediction unit.

S1304: Perform fine selection on intra-predicted initially-selected brightness-directions of the 64*64 video prediction unit and intra-predicted optimal brightness-directions of an adjacent 64*64 video prediction unit according to a second rate-distortion-evaluation-function, to obtain intra-predicted optimal brightness-directions of the 64*64 video prediction unit.

S1305: Perform fine selection on intra-predicted initially-selected brightness-directions of the 32*32 video prediction unit and intra-predicted optimal brightness-directions of an adjacent 32*32 video prediction unit according to a second rate-distortion-evaluation-function, to obtain intra-predicted optimal brightness-directions of the 32*32 video prediction unit.

S1306: Perform fine selection on intra-predicted initially-selected brightness-directions of the 16*16 video prediction unit and intra-predicted optimal brightness-directions of an adjacent 16*16 video prediction unit according to a second rate-distortion-evaluation-function, to obtain intra-predicted optimal brightness-directions of the 16*16 video prediction unit.

S1307: Perform fine selection on intra-predicted initially-selected brightness-directions of the 8*8 video prediction unit, intra-predicted optimal brightness-directions of an upper 16*16 video prediction unit, and intra-predicted optimal brightness-directions of an adjacent 8*8 video prediction unit according to a second rate-distortion-evaluation-function, to obtain intra-predicted optimal brightness-directions of the 8*8 video prediction unit.

S1308: Perform fine selection on intra-predicted initially-selected brightness-directions of the 4*4 video prediction unit, intra-predicted optimal brightness-directions of an upper 8*8 video prediction unit, and intra-predicted optimal brightness-directions of an adjacent 4*4 video prediction unit according to a second rate-distortion-evaluation-function, to obtain intra-predicted optimal brightness-directions of the 4*4 video prediction unit.

S1309: Calculate fine-selection rate-distortion costs in intra-frame chroma prediction directions in 8*8 and 4*4 video prediction units according to the second rate-distortion-evaluation-function, and use chroma prediction directions with the lowest fine-selection rate-distortion costs as intra-predicted optimal chroma-directions of the 8*8 and 4*4 video prediction units.

S1310: Perform initial selection or fine selection or skip encoding on the current independent video image frame according to the intra-predicted optimal brightness-directions of the video prediction units of different sizes acquired in S1304 to S1308 and the intra-predicted optimal chroma-directions of the video prediction units of different sizes acquired in S1309, to implement prediction encoding of the current independent video image frame, increase the encoding speed of corresponding video encoding, and improve the degrees of encoding and compression of corresponding video encoding.

In this way, a process of performing an intra-prediction encoding operation on an independent video image frame that allows an independent decoding operation in the video encoding method and the video encoding apparatus in this specific embodiment is completed.

Figure 14:
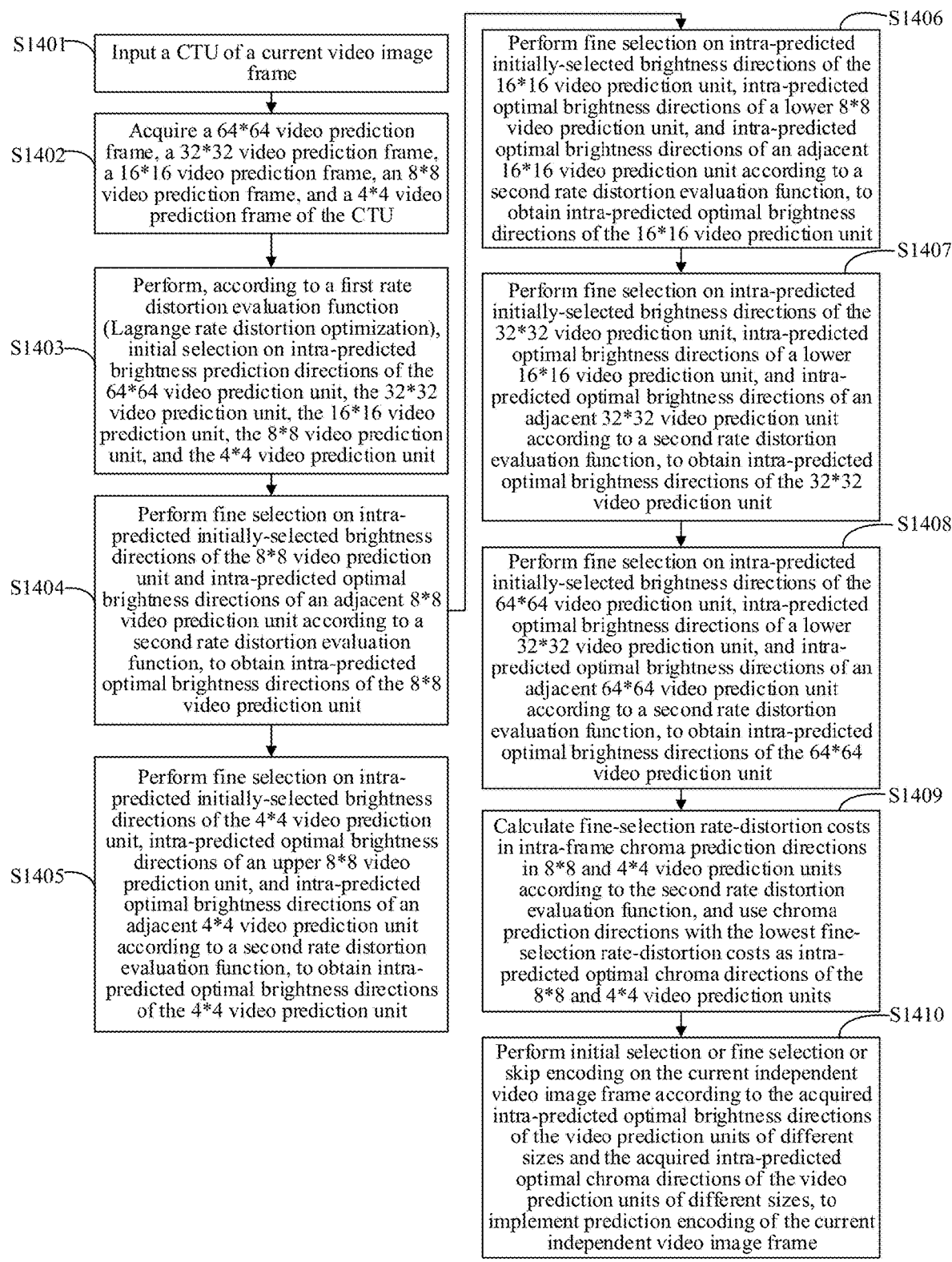
FIG. 14 is a flowchart of a specific embodiment of performing an intra-prediction encoding operation on a bidirectional prediction code frame or an inter-frame prediction code frame in a video encoding method and a video encoding apparatus according to the present disclosure.

During the intra-prediction encoding operation of a bidirectional prediction code frame or an inter-frame prediction code frame in the video encoding method and the video encoding apparatus according to the present disclosure, FIG. 14 is a flowchart of a specific process of performing an intra-prediction encoding operation on a bidirectional prediction code frame or an inter-frame prediction code frame in a video encoding method and a video encoding apparatus according to the present disclosure. The process of the intra-prediction encoding operation includes the followings.

S1401: Input a CTU of a current video image frame.

S1402: Acquire a 64*64 video prediction unit, a 32*32 video prediction unit, a 16*16 video prediction unit, an 8*8 video prediction unit, and a 4*4 video prediction unit of the CTU.

S1403: Perform, according to a first rate-distortion-evaluation-function, initial selection on intra-predicted brightness prediction directions of the 64*64 video prediction unit, the 32*32 video prediction unit, the 16*16 video prediction unit, the 8*8 video prediction unit, and the 4*4 video prediction unit.

S1404: Perform fine selection on intra-predicted initially-selected brightness-directions of the 8*8 video prediction unit and intra-predicted optimal brightness-directions of an adjacent 8*8 video prediction unit according to a second rate-distortion-evaluation-function, to obtain intra-predicted optimal brightness-directions of the 8*8 video prediction unit.

S1405: Perform fine selection on intra-predicted initially-selected brightness-directions of the 4*4 video prediction unit, intra-predicted optimal brightness-directions of an upper 8*8 video prediction unit, and intra-predicted optimal brightness-directions of an adjacent 4*4 video prediction unit according to a second rate-distortion-evaluation-function, to obtain intra-predicted optimal brightness-directions of the 4*4 video prediction unit.

S1406: Perform fine selection on intra-predicted initially-selected brightness-directions of the 16*16 video prediction unit, intra-predicted optimal brightness-directions of a lower 8*8 video prediction unit, and intra-predicted optimal brightness-directions of an adjacent 16*16 video prediction unit according to a second rate-distortion-evaluation-function, to obtain intra-predicted optimal brightness-directions of the 16*16 video prediction unit.

S1407: Perform fine selection on intra-predicted initially-selected brightness-directions of the 32*32 video prediction unit, intra-predicted optimal brightness-directions of a lower 16*16 video prediction unit, and intra-predicted optimal brightness-directions of an adjacent 32*32 video prediction unit according to a second rate-distortion-evaluation-function, to obtain intra-predicted optimal brightness-directions of the 32*32 video prediction unit.

S1408: Perform fine selection on intra-predicted initially-selected brightness-directions of the 64*64 video prediction unit, intra-predicted optimal brightness-directions of a lower 32*32 video prediction unit, and intra-predicted optimal brightness-directions of an adjacent 64*64 video prediction unit according to a second rate-distortion-evaluation-function, to obtain intra-predicted optimal brightness-directions of the 64*64 video prediction unit.

S1409: Calculate fine-selection rate-distortion costs in intra-frame chroma prediction directions in 8*8 and 4*4 video prediction units according to the second rate-distortion-evaluation-function, and use chroma prediction directions with the lowest fine-selection rate-distortion costs as intra-predicted optimal chroma-directions of the 8*8 and 4*4 video prediction units.

S1410: Perform initial selection or fine selection or skip encoding on the current independent video image frame according to the intra-predicted optimal brightness-directions of the video prediction units of different sizes acquired in steps S1404 to S1408 and the intra-predicted optimal chroma-directions of the video prediction units of different sizes acquired in S1409, to implement prediction encoding of the current independent video image frame, increase the encoding speed of corresponding video encoding, and improve the degrees of encoding and compression of corresponding video encoding.

In this way, a process of performing an intra-prediction encoding operation on a bidirectional prediction code frame or inter-frame prediction code frame by the video encoding method and the video encoding apparatus in one embodiment is completed.

In the video encoding method, the video encoding apparatus, and the storage medium according to the present disclosure, different intra-prediction encoding optimization methods are used for an independent video image frame and a non-independent video image frame (for example, a bidirectional prediction code frame or an inter-frame prediction code frame), thereby increasing the encoding speed of corresponding video encoding and improving the degrees of encoding and compression of corresponding video encoding. The technical problem in an existing video encoding method and video encoding apparatus that the encoding is prone to an insignificant speed increase and a greatly reduced compression ratio in a case that intra-frame block prediction of a code block is inadequately optimized are effectively resolved.

Terms such as "component", "module", "system", "interface", and "process" used in the present disclosure are generally intended to refer to computer-related entities: hardware, combinations of hardware and software, software, or software being executed. For example, a component may be, but is not limited to, a process that runs on a processor, a processor, an object, an executable application, a thread of execution, a program, and/or a computer. As shown in the figure, both an application being run in a controller and the controller may be components. One or more components may reside within a process and/or a thread of execution, and a component may be located on one computer and/or distributed between two or more computers.

Figure 15:
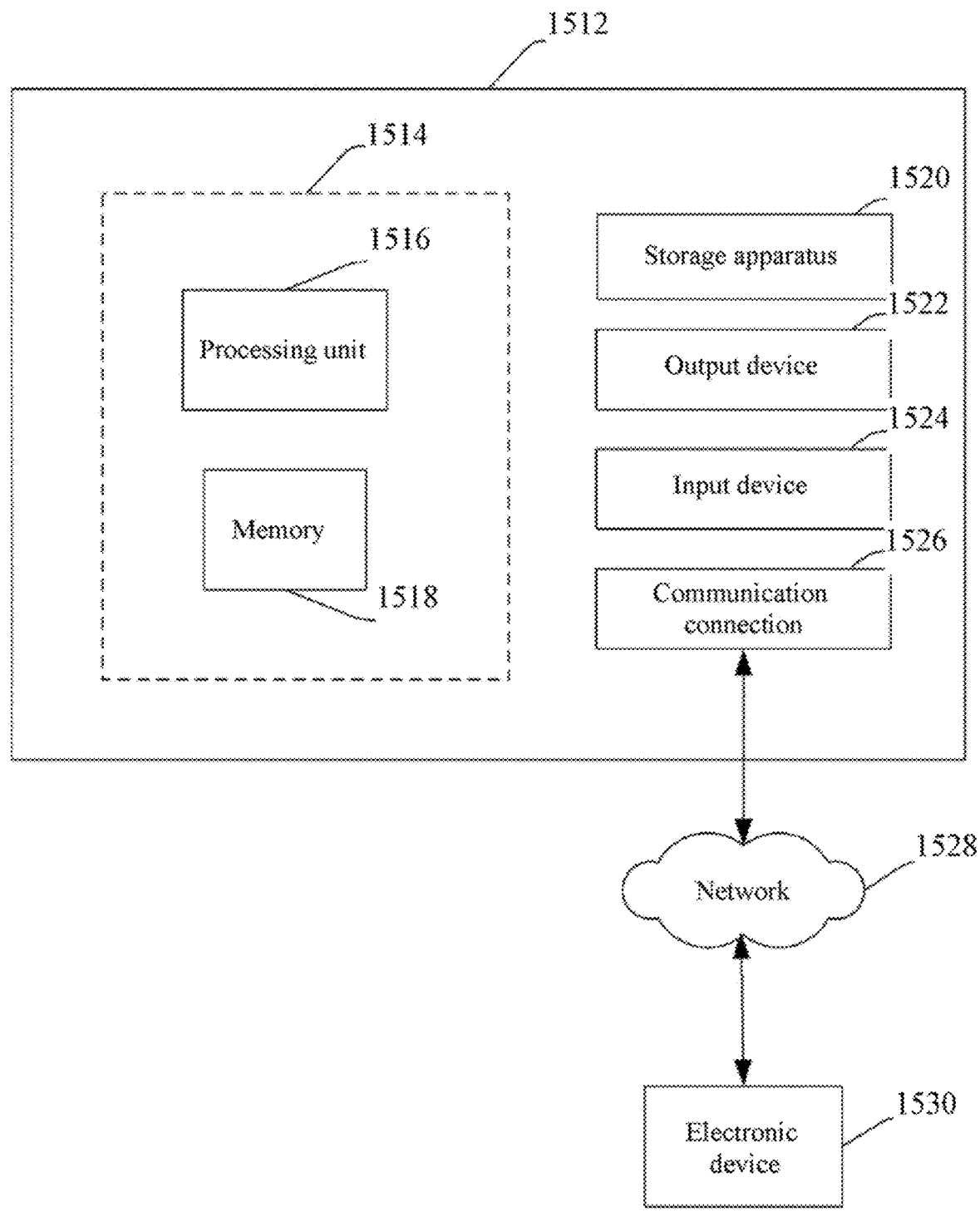
FIG. 15 is a schematic structural diagram of a working environment of an electronic device in which a video encoding apparatus is located according to the present disclosure.

FIG. 15 and subsequent discussion provide a brief and general description of a working environment of an electronic device including a video encoding apparatus of the present disclosure. The working environment in FIG. 15 is only an example of a proper working environment, and is not intended to suggest any limitation on a scope of a purpose or function of the working environment. The example of the electronic device 1512 includes a wearable device, a head mounted device, a medical health platform, a personal computer, a server computer, a handheld or laptop device, a mobile device (for example, a mobile phone, a personal digital assistant (PDA), and a media player), a multiprocessor system, a consumption-based electronic device, a minicomputer, a mainframe computer, a distributed computing environment including the foregoing any system or device, and the like.

Although there is no requirement, the embodiment is described under the general background that a "computer readable instruction" is executed by one or more electronic devices. The computer readable instruction may be distributed by using a computer readable medium (described in the following). The computer readable instruction may be implemented as a program module, such as a function, an object, an application programming interface (API), or a data structure that performs a particular task or implements a particular abstract data type. Typically, functions of the computer readable instruction may be randomly combined or distributed in various environments.

FIG. 15 shows the instance of the electronic device 1512 including one or more configurations of the video encoding apparatus of the present disclosure. In one configuration, the electronic device 1512 includes at least one processing unit 1516 and a memory 1518. According to an exact configuration and type of the electronic device, the memory 1518 may be volatile (for example, a RAM), non-volatile (for example, a ROM or a flash memory), or a combination of the two. The configuration is shown in FIG. 15 by using a dashed line 1514.

In another embodiment, the electronic device 1512 may include an additional characteristic and/or function. For example, the device 1512 may further include an additional storage apparatus (for example, a removable and/or an irremovable storage apparatus). The additional storage apparatus includes a magnetic storage apparatus, an optical storage apparatus, or the like. This additional storage apparatus is shown as a storage apparatus 1520 in FIG. 15. In an embodiment, a computer readable instruction used to implement one or more embodiments provided in this document may be in the storage apparatus 1520. The storage apparatus 1520 may store another computer readable instruction used to implement an operating system, an application program, or the like. The computer readable instruction may be loaded into the memory 1518 to be executed by, for example, the processing unit 1516.

The term "computer readable medium" used in this document includes a computer storage medium. The computer storage medium includes volatile or nonvolatile, and removable or irremovable mediums that are implemented by using any method or technology used to store information such as a computer readable instruction or other data. The memory 1518 and the storage apparatus 1520 are examples of computer storage mediums. The computer storage medium includes but is not limited to a RAM, a ROM, an EEPROM, a flash memory or another memory technology, a CD-ROM, a digital versatile disc (DVD) or another optical storage apparatus, a cassette tape, a magnetic tape, a magnetic disk storage apparatus or another magnetic storage device, or any other medium that can be used to store expected information and can be accessed by the electronic device 1512. Any such computer storage medium may be a portion of the electronic device 1512.

The electronic device 1512 may further include a communication connection 1526 that allows the electronic device 1512 to communicate with another device. The communication connection 1526 may include but is not limited to a modem, a network interface card (NIC), an integrated network interface, a radio frequency transmitter/receiver, an infrared port, a USB connection, or another interface used to connect the electronic device 1512 to another electronic device. The communication connection 1526 may include a wired connection or a wireless connection. The communication connection 1526 may transmit and/or receive communication media.

The term "computer readable medium" may include a communications medium. The communications medium typically includes a computer readable instruction or other data in a "modulated data signal" such as a carrier or another transmission mechanism, and includes any information transfer medium. The term "modulated data signal" may include such a signal: one or more features of the signal are set or changed in a manner of encoding information into the signal.

The electronic device 1512 may include an input device 1524, such as a keyboard, a mouse, a pen, a voice input device, a touch input device, an infrared camera, a video input device and/or any other input device. The device 1512 may also include an output device 1522, such as one or more displays, a speaker, a printer and/or any other output device. The input device 1524 and the output device 1522 may be connected to the electronic device 1512 by using a wired connection, a wireless connection, or any combination of the wired connection and the wireless connection. In an embodiment, an input device or an output device from another electronic device may be used as the input device 1524 or the output device 1522 of the electronic device 1512.

Components of the electronic device 1512 may be connected by using various interconnections (such as a bus). The interconnections may include a peripheral component interconnection (PCI) (such as a fast PCI), a universal serial bus (USB), a live wire (IEEE 1394), an optical bus structure, and the like. In another embodiment, components of the electronic device 1512 may be interconnected by using a network. For example, the memory 1518 may include a plurality of physical memory units that are located at different physical locations and interconnected by using a network.

A person skilled in the art will learn that, a storage device used to store a computer readable instruction may be distributed across networks. For example, an electronic device 1530 that may be accessed by using a network 1528 may store computer readable instructions used to implement one or more embodiments provided in the present disclosure. The electronic device 1512 may access the electronic device 1530 and download a portion of or all of the computer readable instruction for execution. Alternatively, the electronic device 1512 may download a plurality of computer readable instructions as required, or some instructions may be executed in the electronic device 1512 and some instructions may be executed in the electronic device 1530.

This document provides various operations of the embodiments. In an embodiment, the one or more operations may form one or more computer readable instructions stored in a computer readable medium, and when the instructions are executed by the electronic device, a calculation device is caused to perform the operations. A sequence in which some or all operations are described is not to be construed as an implication that these operations need to be sequence-related. The person skilled in the art understands an alternative sequence that has benefits of the specification. In addition, all operations do not need to exist in each embodiment provided in this document.

In addition, although this disclosure has been shown and described relative to one or more implementations, the person skilled in the art thinks of equivalent variations and modifications based on reading and understanding of the specification and the accompanying drawings. This disclosure includes all the modifications and variations, and is limited only by the scope of the claims. Especially, for various functions performed by the foregoing component (such as an element or a resource), a term used to describe the components is intended to correspond to any component (unless otherwise indicated) that performs a specified function of the component (for example, they have equivalent functions), even if a structure of the component is not the same as a disclosed structure of this disclosure that performs the functions in the exemplary implementations shown in this document. In addition, although a particular characteristic of this disclosure is disclosed relative to only one of the several implementations, this characteristic may be combined with one or more other characteristics of another implementation that is expected or beneficial for a given or a particular application. In addition, if terms "include", "have", "contain", or a variation thereof is used in a specific implementation or the claims, the terms are intended to include in a manner similar to a manner of the term "include".

Functional units in the embodiments of the present disclosure may be integrated into one processing module, or each of the units may exist alone physically, or two or more units are integrated into one module. The integrated module may be implemented in a form of hardware, or may be implemented in a form of a software function module. If implemented in the form of software functional modules and sold or used as an independent product, the integrated module may also be stored in a computer-readable storage medium. The aforementioned storage medium may be a read-only memory, a magnetic disk, or an optical disc. The foregoing apparatuses or systems may perform the methods in corresponding method embodiments.

In view of the above, although the present disclosure is disclosed in the above by using various embodiments. Sequence numbers of the embodiments, if any, are merely used for ease of description, and do not limit the sequence of the embodiments of the present disclosure. Moreover, the foregoing embodiments are not intended to limit the present disclosure. A person of ordinary skill in the art may make various variations and modifications without departing from the spirit and scope of the present disclosure. Therefore, the protection scope of the present disclosure fall within the scope defined by the claims.

What is claimed is:

1. A video encoding method for an electronic device, comprising:
receiving a video image frame, and acquiring at least one coding tree unit (CTU) of the video image frame;
dividing the CTU according to different video prediction unit division rules, to acquire video prediction units of different sizes of the CTU;
performing initial selection on intra-predicted brightness prediction directions of the video prediction units of different sizes according to a first rate-distortion-evaluation-function, to obtain a preset number of intra-predicted initially-selected brightness-directions of the video prediction units of different sizes;
performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size;
performing fine selection on intra-predicted chroma prediction directions of the video prediction units of different sizes according to the second rate-distortion-evaluation-function, to obtain intra-predicted optimal chroma-directions of the video prediction units of different sizes; and
performing intra-prediction encoding on a current video encoding unit according to intra-predicted optimal brightness-directions of the video prediction units of different sizes and the intra-predicted optimal chroma-directions of the video prediction units of different sizes.

2. The video encoding method according to claim 1, wherein: the video image frame is an independent video image frame that allows an independent decoding operation, and the performing fine selection on intra-predicted optimal brightness-directions of a related video prediction unit and intra-predicted initially-selected brightness-directions of a video prediction unit of a current size further comprises:
performing fine selection on intra-predicted optimal brightness-directions of a video prediction unit of an upper size, intra-predicted optimal brightness-directions of a video prediction unit corresponding to an adjacent video encoding block of the video prediction unit of the current size, intra-predicted optimal brightness-directions of an adjacent video prediction unit of the current size, and the intra-predicted initially-selected brightness-directions of the video prediction unit of the current size according to the second rate-distortion-evaluation-function, to obtain the intra-predicted optimal brightness-directions of the video prediction unit of the current size.

3. The video encoding method according to claim 2, wherein the dividing the CTU according to different video prediction unit division rules, to acquire video prediction units of different sizes of the CTU comprises:
dividing the CTU according to the different video prediction unit division rules, to acquire a 64*64 video prediction unit, a 32*32 video prediction unit, a 16*16 video prediction unit, an 8*8 video prediction unit, and a 4*4 video prediction unit of the CTU.

4. The video encoding method according to claim 3, wherein the performing initial selection on intra-predicted brightness prediction directions of the video prediction units of different sizes further comprises:
dividing 33 angular-mode brightness prediction directions into five brightness prediction direction areas in a case that the video prediction unit is a 64*64 video prediction unit; and setting seven brightness prediction directions, one planar-mode brightness prediction direction, and one DC-mode brightness prediction direction in a brightness prediction direction area corresponding to a central brightness prediction direction having the lowest initial-selection rate-distortion cost as nine intra-predicted initially-selected brightness-directions of the 64*64 video prediction unit.

5. The video encoding method according to claim 3, wherein the performing initial selection on intra-predicted brightness prediction directions of the video prediction units of different sizes further comprises:
dividing 33 angular-mode brightness prediction directions into 11 brightness prediction direction areas in a case that the video prediction unit is a 32*32 video prediction unit; and setting three brightness prediction directions, one planar-mode brightness prediction direction, and one DC-mode brightness prediction direction in a brightness prediction direction area corresponding to a central brightness prediction direction having the lowest initial-selection rate-distortion cost as five intra-predicted initially-selected brightness-directions of the 32*32 video prediction unit.

6. The video encoding method according to claim 3, wherein the performing initial selection on intra-predicted brightness prediction directions of the video prediction units of different sizes further comprises:
dividing 33 angular-mode brightness prediction directions into 11 brightness prediction direction areas in a case that the video prediction unit is a 16*16 video prediction unit; and setting three brightness prediction directions, one planar-mode brightness prediction direction, and one DC-mode brightness prediction direction in a brightness prediction direction area corresponding to a central brightness prediction direction having the lowest initial-selection rate-distortion cost as five intra-predicted initially-selected brightness-directions of the 16*16 video prediction unit.

7. The video encoding method according to claim 3, wherein the performing initial selection on intra-predicted brightness prediction directions of the video prediction units of different sizes further comprises:
dividing 33 angular-mode brightness prediction directions into seven brightness prediction direction areas in a case that the video prediction unit is an 8*8 video prediction unit; and setting five brightness prediction directions, one planar-mode brightness prediction direction, and one DC-mode brightness prediction direction in a brightness prediction direction area corresponding to a central brightness prediction direction having the lowest initial-selection rate-distortion cost as seven intra-predicted initially-selected brightness-directions of the 8*8 video prediction unit.

8. The video encoding method according to claim 3, wherein the performing initial selection on intra-predicted brightness prediction directions of the video prediction units of different sizes according to a first rate-distortion-evaluation-function, to obtain a preset number of intra-predicted initially-selected brightness-directions of the video prediction units of different sizes comprises:
dividing 33 angular-mode brightness prediction directions into five brightness prediction direction areas in a case that the video prediction unit is a 4*4 video prediction unit; and setting seven brightness prediction directions, one planar-mode brightness prediction direction, and one DC-mode brightness prediction direction in a brightness prediction direction area corresponding to a central brightness prediction direction having the lowest initial-selection rate-distortion cost as nine intra-predicted initially-selected brightness-directions of the 4*4 video prediction unit.

9. The video encoding method according to claim 3, wherein the performing fine selection on intra-predicted optimal brightness-directions of a video prediction unit of an upper size, intra-predicted optimal brightness-directions of a video prediction unit corresponding to an adjacent video encoding block of the video prediction unit of the current size, intra-predicted optimal brightness-directions of an adjacent video prediction unit of the current size, and the intra-predicted initially-selected brightness-directions of the video prediction unit of the current size further comprises:
setting a preset number of intra-predicted initially-selected brightness-directions of the video prediction unit of the current size that have a relatively low initial-selection rate-distortion cost as optimized intra-predicted initially-selected brightness-directions of the video prediction unit of the current size;
determining whether any of the optimized intra-predicted initially-selected brightness-directions of the video prediction unit of the current size is the same as any of the intra-predicted optimal brightness-directions of the adjacent video prediction unit of the current size in a case that the video prediction unit is a 64*64, 32*32 or 16*16 video prediction unit;
setting the same optimized intra-predicted initially-selected brightness-directions having the lowest initial-selection rate-distortion cost of the video prediction unit of the current size as contrast intra-predicted initially-selected brightness-directions in a case that it is determined that they are the same; and performing fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and using brightness-directions with the lowest fine-selection rate-distortion cost as the intra-predicted optimal brightness-directions of the video prediction unit of the current size; and
performing fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and using brightness-directions with the lowest fine-selection rate-distortion cost as the intra-predicted optimal brightness-directions of the video prediction unit of the current size.

10. The video encoding method according to claim 3, wherein the performing fine selection on intra-predicted optimal brightness-directions of a video prediction unit of an upper size, intra-predicted optimal brightness-directions of a video prediction unit corresponding to an adjacent video encoding block of the video prediction unit of the current size, intra-predicted optimal brightness-directions of an adjacent video prediction unit of the current size, and the intra-predicted initially-selected brightness-directions of the video prediction unit of the current size further comprises:
setting a preset number of intra-predicted initially-selected brightness-directions of the video prediction unit of the current size that have a relatively low initial-selection rate-distortion cost as optimized intra-predicted initially-selected brightness-directions of the video prediction unit of the current size;
determining whether any of the optimized intra-predicted initially-selected brightness-directions of the video prediction unit of the current size is the same as any of the intra-predicted optimal brightness-directions of the video prediction unit of the upper size, the intra-predicted optimal brightness-directions of the video prediction unit corresponding to the adjacent video encoding block of the video prediction unit of the current size, and the intra-predicted optimal brightness-directions of the adjacent video prediction unit of the current size in a case that the video prediction unit is an 8*8 video prediction unit or a 4*4 video prediction unit;
setting the same optimized intra-predicted initially-selected brightness-directions having the lowest initial-selection rate-distortion cost of the video prediction unit of the current size as contrast intra-predicted initially-selected brightness-directions in a case that it is determined that they are the same; and performing fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and using brightness-directions with the lowest fine-selection rate-distortion cost as the intra-predicted optimal brightness-directions of the video prediction unit of the current size; and
performing fine selection on the intra-predicted optimal brightness-directions of the video prediction unit of the upper size, the intra-predicted optimal brightness-directions of the video prediction unit corresponding to the adjacent video encoding block of the video prediction unit of the current size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and using brightness-directions with the lowest fine-selection rate-distortion cost as the intra-predicted optimal brightness-directions of the video prediction unit of the current size.

11. The video encoding method according to claim 10, further comprising:
determining that a product of multiplying a fine-selection rate-distortion cost in the intra-predicted optimal brightness-directions of the video prediction unit of the current size by a set coefficient is greater than a fine-selection rate-distortion cost in the intra-predicted optimal brightness-directions of the video prediction unit of the upper size in a case that the video prediction unit is a 4*4 video prediction unit, setting the fine-selection rate-distortion cost in the intra-predicted optimal brightness-directions of the video prediction unit of the current size as a preset maximum value, and stopping performing setting of intra-predicted optimal brightness-directions and intra-predicted optimal chroma-directions on other video prediction units of a video encoding block corresponding to the video prediction unit of the current size.

12. The video encoding method according to claim 1, wherein the performing fine selection on intra-predicted chroma prediction directions of the video prediction units of different sizes according to the second rate-distortion-evaluation-function, to obtain intra-predicted optimal chroma-directions of the video prediction units of different sizes comprises:
performing fine selection on intra-predicted optimal chroma-directions of a video prediction unit of an upper size and intra-predicted optimal chroma-directions of a video prediction unit corresponding to an adjacent video encoding block of the video prediction unit of the current size according to the second rate-distortion-evaluation-function; and using brightness-directions with the lowest fine-selection rate-distortion cost as intra-predicted optimal chroma-directions of the video prediction unit of the current size.

13. The video encoding method according to claim 1, wherein:
the video image frame is a bidirectional prediction code frame or a forward prediction code frame, and the performing fine selection on intra-predicted optimal brightness-directions of a related video prediction unit and intra-predicted initially-selected brightness-directions of a video prediction unit of a current size further comprises:
performing fine selection on intra-predicted optimal brightness-directions of an adjacent video prediction unit of the current size and the intra-predicted initially-selected brightness-directions of the video prediction unit of the current size according to the second rate-distortion-evaluation-function in a case that the video prediction unit is an 8*8 video prediction unit, to obtain the intra-predicted optimal brightness-directions of the video prediction unit of the current size;
performing fine selection on intra-predicted optimal brightness-directions of a video prediction unit of an upper size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 4*4 video prediction unit, to obtain the intra-predicted optimal brightness-directions of the video prediction unit of the current size; or
performing fine selection on intra-predicted finely-selected brightness-directions of a video prediction unit of a lower size, intra-predicted optimal brightness-directions of an adjacent video prediction unit of the current size, and the intra-predicted initially-selected brightness-directions of the video prediction unit of the current size according to the second rate-distortion-evaluation-function in a case that the video prediction unit is a 16*16, 32*32 or 64*64 video prediction unit, to obtain the intra-predicted optimal brightness-directions of the video prediction unit of the current size.

14. The video encoding method according to claim 13, wherein the performing fine selection on intra-predicted optimal brightness-directions of an adjacent video prediction unit of the current size and the intra-predicted initially-selected brightness-directions of the video prediction unit of the current size according to the second rate-distortion-evaluation-function in a case that the video prediction unit is an 8*8 video prediction unit, to obtain the intra-predicted optimal brightness-directions of the video prediction unit of the current size comprises:
setting a preset number of intra-predicted initially-selected brightness-directions of the video prediction unit of the current size that have a relatively low rate-distortion cost as optimized intra-predicted initially-selected brightness-directions of the video prediction unit of the current size;
determining whether any of the optimized intra-predicted initially-selected brightness-directions of the video prediction unit of the current size is the same as any of the intra-predicted optimal brightness-directions of the adjacent video prediction unit of the current size;
setting the same optimized intra-predicted initially-selected brightness-directions having the lowest initial-selection rate-distortion cost of the video prediction unit of the current size as contrast intra-predicted initially-selected brightness-directions in a case that it is determined that they are the same; and performing fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and using brightness-directions with the lowest fine-selection rate-distortion cost as the intra-predicted optimal brightness-directions of the video prediction unit of the current size; and
performing fine selection on the intra-predicted optimal brightness-directions of the adjacent video prediction unit of the current size and the optimized intra-predicted initially-selected brightness-directions of the video prediction unit of the current size according to the second rate-distortion-evaluation-function in a case that it is determined that they are not the same; and using brightness-directions with the lowest fine-selection rate-distortion cost as the intra-predicted optimal brightness-directions of the video prediction unit of the current size.

15. The video encoding method according to claim 13, wherein the performing fine selection on intra-predicted optimal brightness-directions of a video prediction unit of an upper size, intra-predicted optimal brightness-directions of an adjacent video prediction unit of the current size, and the intra-predicted initially-selected brightness-directions of the video prediction unit of the current size further comprises:
setting a preset number of intra-predicted initially-selected brightness-directions of the video prediction unit of the current size that have a relatively low rate-distortion cost as optimized intra-predicted initially-selected brightness-directions of the video prediction unit of the current size;
determining whether any of the optimized intra-predicted initially-selected brightness-directions of the video prediction unit of the current size is the same as any of the intra-predicted optimal brightness-directions of the video prediction unit of the upper size and the intra-predicted optimal brightness-directions of the adjacent video prediction unit of the current size;
setting the same optimized intra-predicted initially-selected brightness-directions having the lowest initial-selection rate-distortion cost of the video prediction unit of the current size as contrast intra-predicted initially-selected brightness-directions in a case that it is determined that they are the same; and performing fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and using brightness-directions with the lowest fine-selection rate-distortion cost as the intra-predicted optimal brightness-directions of the video prediction unit of the current size; and
performing fine selection on the intra-predicted optimal brightness-directions of the video prediction unit of the upper size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and using brightness-directions with the lowest fine-selection rate-distortion cost as the intra-predicted optimal brightness-directions of the video prediction unit of the current size.

16. The video encoding method according to claim 15, further comprising:
determining that a product of multiplying a fine-selection rate-distortion cost in the intra-predicted optimal brightness-directions of the video prediction unit of the current size by a set coefficient is greater than a fine-selection rate-distortion cost in the intra-predicted optimal brightness-directions of the video prediction unit of the upper size, setting the fine-selection rate-distortion cost in the intra-predicted optimal brightness-directions of the video prediction unit of the current size as a preset maximum value, and stopping performing setting of intra-predicted optimal brightness-directions and intra-predicted optimal chroma-directions on all video prediction units of a video encoding block corresponding to the video prediction unit of the current size.

17. The video encoding method according to claim 15, further comprising:
determining that intra-predicted optimal brightness-directions of other video prediction units corresponding to a video encoding block to which the video prediction unit of the current size belongs are consistent with the intra-predicted optimal brightness-directions of the video prediction unit of the upper size, setting the fine-selection rate-distortion cost in the intra-predicted optimal brightness-directions of the video prediction unit of the current size as a preset maximum value, and stopping performing setting of intra-predicted optimal brightness-directions and intra-predicted optimal chroma-directions on all video prediction units of a video encoding block corresponding to the video prediction unit of the current size.

18. The video encoding method according to claim 13, wherein the performing fine selection on intra-predicted finely-selected brightness-directions of a video prediction unit of a lower size, intra-predicted optimal brightness-directions of an adjacent video prediction unit of the current size, and the intra-predicted initially-selected brightness-directions of the video prediction unit of the current size further comprises:
setting a preset number of intra-predicted initially-selected brightness-directions of the video prediction unit of the current size that have a relatively low rate-distortion cost as optimized intra-predicted initially-selected brightness-directions of the video prediction unit of the current size;
determining whether any of the optimized intra-predicted initially-selected brightness-directions of the video prediction unit of the current size is the same as any of the intra-predicted optimal brightness-directions of the video prediction unit of the lower size and the intra-predicted optimal brightness-directions of the adjacent video prediction unit of the current size;
setting the same optimized intra-predicted initially-selected brightness-directions having the lowest initial-selection rate-distortion cost of the video prediction unit of the current size as contrast intra-predicted initially-selected brightness-directions in a case that it is determined that they are the same; and performing fine selection on the contrast intra-predicted initially-selected brightness-directions and intra-predicted initially-selected brightness-directions whose initial-selection rate-distortion cost is lower than that of the contrast intra-predicted initially-selected brightness-directions according to the second rate-distortion-evaluation-function, and using brightness-directions with the lowest fine-selection rate-distortion cost as the intra-predicted optimal brightness-directions of the video prediction unit of the current size; and
performing fine selection on the intra-predicted optimal brightness-directions of the video prediction unit of the lower size, the intra-predicted optimal brightness-directions of the adjacent video prediction unit of the current size, and the optimized intra-predicted initially-selected brightness-directions of the video prediction unit of the current size according to the second rate-distortion-evaluation-function in a case that it is determined that they are not the same; and using brightness-directions with the lowest fine-selection rate-distortion cost as the intra-predicted optimal brightness-directions of the video prediction unit of the current size.

19. A video encoding device, comprising: a memory; and a processor coupled to the memory and configured to perform:

receiving a video image frame, and acquiring at least one coding tree unit (CTU) of the video image frame;

dividing the CTU according to different video prediction unit division rules, to acquire video prediction units of different sizes of the CTU;

performing initial selection on intra-predicted brightness prediction directions of the video prediction units of different sizes according to a first rate-distortion-evaluation-function, to obtain a preset number of intra-predicted initially-selected brightness-directions of the video prediction units of different sizes;

performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size;

performing fine selection on intra-predicted chroma prediction directions of the video prediction units of different sizes according to the second rate-distortion-evaluation-function, to obtain intra-predicted optimal chroma-directions of the video prediction units of different sizes; and performing intra-prediction encoding on a current video encoding unit according to intra-predicted optimal brightness-directions of the video prediction units of different sizes and the intra-predicted optimal chroma-directions of the video prediction units of different sizes.

20. A non-transitory storage medium, storing processor executable instructions, the instructions, when being executed by one or more processors, implementing:

receiving a video image frame, and acquiring at least one coding tree unit (CTU) of the video image frame;

dividing the CTU according to different video prediction unit division rules, to acquire video prediction units of different sizes of the CTU;

performing initial selection on intra-predicted brightness prediction directions of the video prediction units of different sizes according to a first rate-distortion-evaluation-function, to obtain a preset number of intra-predicted initially-selected brightness-directions of the video prediction units of different sizes;

performing fine selection on intra-predicted optimal brightness-directions of a related video prediction unit and intra-predicted initially-selected brightness-directions of a video prediction unit of a current size according to a second rate-distortion-evaluation-function, to obtain intra-predicted optimal brightness-directions of the video prediction unit of the current size;

performing fine selection on intra-predicted chroma prediction directions of the video prediction units of different sizes according to the second rate-distortion-evaluation-function, to obtain intra-predicted optimal chroma-directions of the video prediction units of different sizes; and performing intra-prediction encoding on a current video encoding unit according to intra-predicted optimal brightness-directions of the video prediction units of different sizes and the intra-predicted optimal chroma-directions of the video prediction units of different sizes.

* * * * *